United States Patent
Ono

(10) Patent No.: US 10,298,843 B2
(45) Date of Patent: May 21, 2019

(54) IMAGE PROCESSING DEVICE, IMAGE PROCESSING METHOD, AND ELECTRONIC APPARATUS FOR MOTION DETECTION IN IMAGE

(71) Applicant: SONY CORPORATION, Tokyo (JP)

(72) Inventor: Hiroaki Ono, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 38 days.

(21) Appl. No.: 15/303,751

(22) PCT Filed: Apr. 8, 2015

(86) PCT No.: PCT/JP2015/060926
§ 371 (c)(1),
(2) Date: Oct. 13, 2016

(87) PCT Pub. No.: WO2015/163145
PCT Pub. Date: Oct. 29, 2015

(65) Prior Publication Data
US 2017/0041542 A1 Feb. 9, 2017

(30) Foreign Application Priority Data

Apr. 22, 2014 (JP) ................................. 2014-087892

(51) Int. Cl.
*H04N 5/232* (2006.01)
*G06T 5/50* (2006.01)
(Continued)

(52) U.S. Cl.
CPC ......... *H04N 5/23254* (2013.01); *G06T 5/007* (2013.01); *G06T 5/50* (2013.01);
(Continued)

(58) Field of Classification Search
CPC ............... H04N 5/23254; H04N 9/045; H04N 5/35554; H04N 5/3532; H04N 5/2357; G06T 7/20
(Continued)

(56) References Cited

U.S. PATENT DOCUMENTS

2012/0194689 A1* 8/2012 Kodama ............... H04N 5/2351
348/220.1
2013/0342726 A1* 12/2013 Ebina .................... H04N 5/2357
348/226.1
(Continued)

FOREIGN PATENT DOCUMENTS

EP 2790399 A 10/2014
JP 2013-121099 A 6/2013
(Continued)

OTHER PUBLICATIONS

International Search Report and Written Opinion of PCT Application No. PCT/JP2015/060926, dated Jun. 30, 2015, 04 pages of English Translation and 05 pages of ISRWO.
(Continued)

*Primary Examiner* — Lin Ye
*Assistant Examiner* — Chan T Nguyen
(74) *Attorney, Agent, or Firm* — Chip Law Group

(57) ABSTRACT

The present technology relates to an image processing device, image processing method, electronic apparatus, and program, capable of performing motion detection allowing the effects by periodic noise such as flicker to be reduced. An image processing device includes an intensity ratio calculation unit configured to calculate a ratio relating to an intensity of a signal value at a predetermined position in an image captured under different exposure conditions, and a contribution calculation unit configured to calculate a contribution indicating whether an intensity ratio calculated by (Continued)

the intensity ratio calculation unit is derived from a periodic noise component or is derived from motion. The periodic noise is, for example, flicker. The intensity ratio calculation unit calculates the intensity ratio from one image captured using an image sensor in which pixels for which the different exposure conditions are set exist together. The present technology is applicable to an imaging device.

14 Claims, 31 Drawing Sheets

(51) Int. Cl.
    *G06T 5/00*     (2006.01)
    *H04N 5/235*     (2006.01)
    *H04N 5/353*     (2011.01)
    *H04N 5/355*     (2011.01)
    *H04N 9/04*     (2006.01)
(52) U.S. Cl.
    CPC ......... *H04N 5/2357* (2013.01); *H04N 5/3532* (2013.01); *H04N 5/35554* (2013.01); *H04N 9/045* (2013.01); *G06T 2207/10144* (2013.01); *G06T 2207/20012* (2013.01); *G06T 2207/20208* (2013.01)

(58) Field of Classification Search
    USPC ....................................................... 348/226.1
    See application file for complete search history.

(56) References Cited

U.S. PATENT DOCUMENTS

2014/0153839 A1\*   6/2014   Tsuzuki ............... H04N 5/2357
                                                     382/254
2014/0375848 A1   12/2014   Yamamoto et al.
2015/0195487 A1\*   7/2015   Liu .......................... H04N 5/21
                                                     348/447

FOREIGN PATENT DOCUMENTS

| JP | 2014-110621 A | 6/2014 |
| KR | 10-2014-0071871 A | 6/2014 |
| WO | 2013/084605 A1 | 6/2013 |

OTHER PUBLICATIONS

International Preliminary Report on Patentability of PCT Application No. PCT/JP2015/060926, dated Oct. 25, 2016, 4 pages.

\* cited by examiner

FIG. 4

|  | 200(1,2) | 200(1,3) | 200(1,4) | 200(1,5) | 200(1,6) | 200(1,7) | 200(1,8) |
|---|---|---|---|---|---|---|---|
| 200(1,1) | R | G | R | G | R | G | R | G |
| 200(2,1) | G | B | G | B | G | B | G | B |
| 200(3,1) | R | G | R | G | R | G | R | G |
| 200(4,1) | G | B | G | B | G | B | G | B |
| 200(5,1) | R | G | R | G | R | G | R | G |
| 200(6,1) | G | B | G | B | G | B | G | B |
| 200(7,1) | R | G | R | G | R | G | R | G |
| 200(8,1) | G | B | G | B | G | B | G | B |

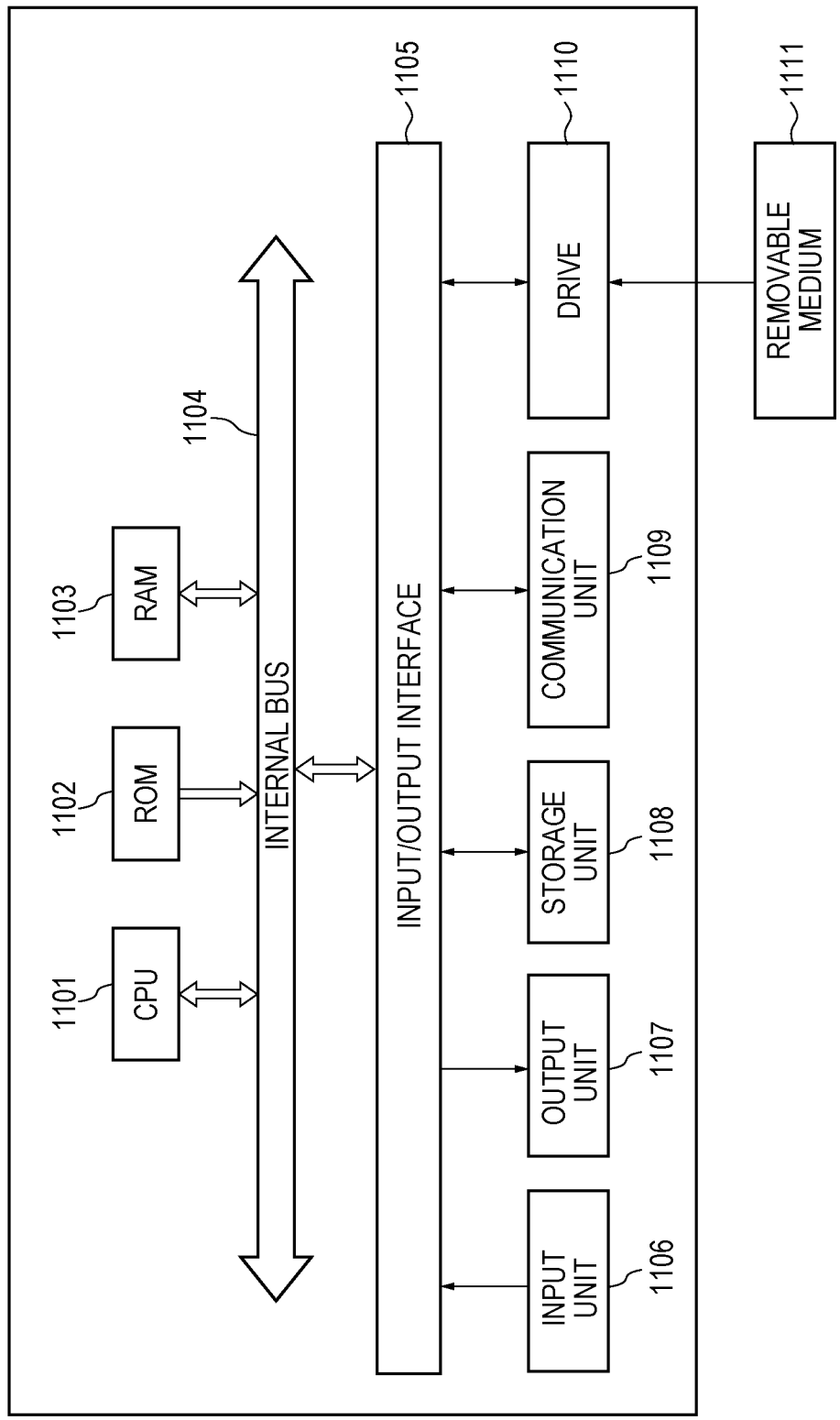

IMAGE PROCESSING DEVICE, IMAGE PROCESSING METHOD, AND ELECTRONIC APPARATUS FOR MOTION DETECTION IN IMAGE

CROSS REFERENCE TO RELATED APPLICATIONS

This application is a U.S. National Phase of International Patent Application No. PCT/JP2015/060926 filed on Apr. 8, 2015, which claims priority benefit of Japanese Patent Application No. JP 2014-087892 filed in the Japan Patent Office on Apr. 22, 2014. Each of the above-referenced applications is hereby incorporated herein by reference in its entirety.

TECHNICAL FIELD

The present technology relates to an image processing device, an image processing method, an electronic apparatus, and a program. More particularly, the present technology relates to an image processing device, image processing method, electronic apparatus, and program, which performs motion detection with the reduced influence of flicker that occurs in an image.

BACKGROUND ART

Capturing an image with a camera equipped with an XY address scanning type image sensor, such as a complementary metal oxide semiconductor (CMOS) image sensor, under illumination of a fluorescent lamp may cause occurrence of brightness non-uniformity or color non-uniformity in the form of stripes in video signals. This phenomenon is called flicker. This occurs due to the fact that a fluorescent lamp connected to a commercial power supply (alternating current) basically repeats blinking on and off with a cycle which is basically twice that of a power supply frequency and also due to the operating principle of an image sensor.

An image with flicker shows brightness variation pattern in the form of stripes extending in the horizontal direction. As one example, upon observing a moving image, stripes flowing up and down will appear. When detection of a region in which motion exists in such an image is performed using the image, flicker is more likely to be detected as the region in which motion exists. An example of an approach for motion detection with the reduced influence of flicker includes Patent Literatures 1 to 3.

CITATION LIST

Patent Literature

Patent Literature 1: JP 2009-169886A
Patent Literature 2: JP 2011-024035A
Patent Literature 3: JP 2008-109370A

SUMMARY OF INVENTION

Technical Problem

Patent Literature 1 discloses a technique to perform motion detection corresponding to flicker by using a plurality of frames in which flicker phases are equal. However, in the method disclosed in Patent Literature 1, the previous frame is held, and thus it is necessary to provide a frame memory for at least three frames, which possibly leads to the occurrence of latency. In addition, it may be likely to fail to cope with the spatial variations of a flicker light source.

Patent Literature 2 discloses a technique to detect motion without the use of a frame memory. However, in the technique disclosed in Patent Literature 2, the exposure is controlled to be an integral multiple of the period of flicker to cope with the flicker environment. Accordingly, the exposure will be restricted, and thus it may be likely to fail to capture an image with a desired exposure.

Patent Literature 3 discloses a method of performing flicker correction by dividing an image into regions and by calculating a reference value that does not contain a flicker component for each region using a plurality of frames. However, the method disclosed in Patent Literature 3 can cope with the spatial light source variations of the flicker, but it fails to cope with the detection of a moving object for the purpose of flicker correction, which necessitates a frame memory, thereby possibly leading to the occurrence of latency.

The present technology has been made in view of such circumstances, and is intended to be capable of performing motion detection that prevents erroneous detection due to periodic noise such as flicker.

Solution to Problem

An image processing device according to an aspect of the present technology includes: an intensity ratio calculation unit configured to calculate a ratio relating to an intensity of a signal value at a predetermined position in an image captured under different exposure conditions; and a contribution calculation unit configured to calculate a contribution indicating whether an intensity ratio calculated by the intensity ratio calculation unit is derived from a periodic noise component or is derived from motion.

The periodic noise can be flicker.

The intensity ratio calculation unit can calculate the intensity ratio from one image captured using an image sensor in which pixels for which the different exposure conditions are set exist together.

The intensity ratio calculation unit can calculate the intensity ratio from a plurality of images that are captured under the different exposure conditions.

A position in the image having the contribution calculated by the contribution calculation unit greater than or equal to a predetermined value can be detected as motion.

The intensity ratio can be a ratio of pixel values of a pixel to be a calculation target in the image captured under the different exposure conditions or can be a ratio of signal values calculated from a pixel value of a pixel in an adjacent region of a pixel to be a calculation target.

The image processing device can further include: a conversion coefficient calculation unit configured to calculate a conversion coefficient using the intensity ratio calculated by the intensity ratio calculation unit, the conversion coefficient being used to, when the periodic noise of a first image captured under a first exposure condition is set as a reference, convert the periodic noise of a second image captured under a second exposure condition into the periodic noise set as the reference.

The conversion coefficient calculation unit can set an intensity ratio of a mode value of the intensity ratios calculated by the intensity ratio calculation unit to the conversion coefficient.

The conversion coefficient calculation unit can set a median value of the intensity ratios calculated by the intensity ratio calculation unit to the conversion coefficient.

The conversion coefficient calculation unit can set a weighted mean value of the intensity ratio calculated by the intensity ratio calculation unit to the conversion coefficient.

Motion in the image can be detected by converting the periodic noise of the second image into the periodic noise set as the reference using the conversion coefficient calculated by the conversion coefficient calculation unit and by taking a difference between the converted second image and the first image.

The image processing device can further include: a period detection unit configured to determine a period of the periodic noise from a change in the conversion coefficients calculated by the conversion coefficient calculation unit.

The image processing device can further include: an updating unit configured to update the conversion coefficient calculated by the conversion coefficient calculation unit using a period detected by the period detection unit.

The conversion coefficient can be calculated for each line in a horizontal direction within the image.

The conversion coefficient can be calculated for each pixel in a line in a horizontal direction within the image and can be calculated using the intensity ratio within a predetermined range around a pixel to be a calculation target.

The image processing device can further include: a conversion coefficient calculation unit configured to calculate a conversion coefficient used to, when the periodic noise of a first image captured under a first exposure condition that is set to an integral multiple of a period of the periodic noise is set as a reference, convert the periodic noise of a second image captured under a second exposure condition into the periodic noise set as the reference.

The image processing device can have a stack structure together with an image sensor configured to capture an image under the different exposure conditions.

An image processing method according to an aspect of the present technology includes the steps of: calculating a ratio relating to an intensity of a signal value at a predetermined position in an image captured under different exposure conditions; and calculating a contribution indicating whether the calculated intensity ratio is derived from a periodic noise component or is derived from motion.

A program according to an aspect of the present technology causes an image processing device configured to process an image captured using an image sensor to execute a process comprising steps of: calculating a ratio relating to an intensity of a signal value at a predetermined position in an image captured under different exposure conditions; and calculating a contribution indicating whether the calculated intensity ratio is derived from a periodic noise component or is derived from motion.

An electronic apparatus according to an aspect of the present technology includes: an image processing unit configured to include an intensity ratio calculation unit configured to calculate a ratio relating to an intensity of a signal value at a predetermined position in an image captured under different exposure conditions, and a contribution calculation unit configured to calculate a contribution indicating whether an intensity ratio calculated by the intensity ratio calculation unit is derived from a periodic noise component or is derived from motion; and a signal processing unit configured to perform signal processing on a signal outputted from the image processing unit.

In an image processing device, an image processing method, and a program according to an aspect of the present technology, a ratio relating to an intensity of a signal value at a predetermined position in an image captured under different exposure conditions is calculated, and a contribution indicating whether the calculated intensity ratio is derived from a periodic noise component or is derived from motion is calculated.

The electronic apparatus according to an aspect of the present technology is configured to include the image processing device.

Advantageous Effects of Invention

According to an aspect of the present technology, it is possible to perform motion detection that prevents erroneous detection due to periodic noise such as flicker.

Note that the effects described above are not necessarily limited and any effect that is set forth herein can be achieved.

BRIEF DESCRIPTION OF DRAWINGS

FIG. 4 is a diagram illustrating an exemplary arrangement of pixels in which different exposure times are set.

FIG. 6 is a diagram illustrating an exemplary arrangement of pixels in which different exposure times are set.

FIG. 7 is a diagram illustrating an exemplary arrangement of pixels in which different exposure times are set.

FIG. 8 is a diagram illustrating an exemplary arrangement of pixels in which different exposure times are set.

FIG. 9 is a diagram illustrating an exemplary arrangement of pixels in which different exposure times are set.

FIG. 11 is a diagram illustrating an exemplary arrangement of pixels in which different exposure times are set.

FIG. 18 is a diagram illustrated to describe calculation of an intensity ratio.

FIG. 31 is a diagram illustrated to describe a recording medium.

DESCRIPTION OF EMBODIMENT(S)

A best mode for carrying out the present technology (hereinafter, referred to as "embodiment") will be described. The description will be given in the order shown below.
1. Flicker Occurrence Principle and Flicker Correction Principle
2. Configuration of Imaging Device
3. Configuration of Image Processing Unit according to First Embodiment
4. Image Processing according to First Embodiment
5. Configuration of Image Processing Unit according to Second Embodiment
6. Image Processing according to Second Embodiment
7. Image Processing according to Third Embodiment
8. Advantageous Effect
9. Other Configurations
10. Recording Medium <Flicker Occurrence Principle and Flicker Correction Principle>

Figure 1:
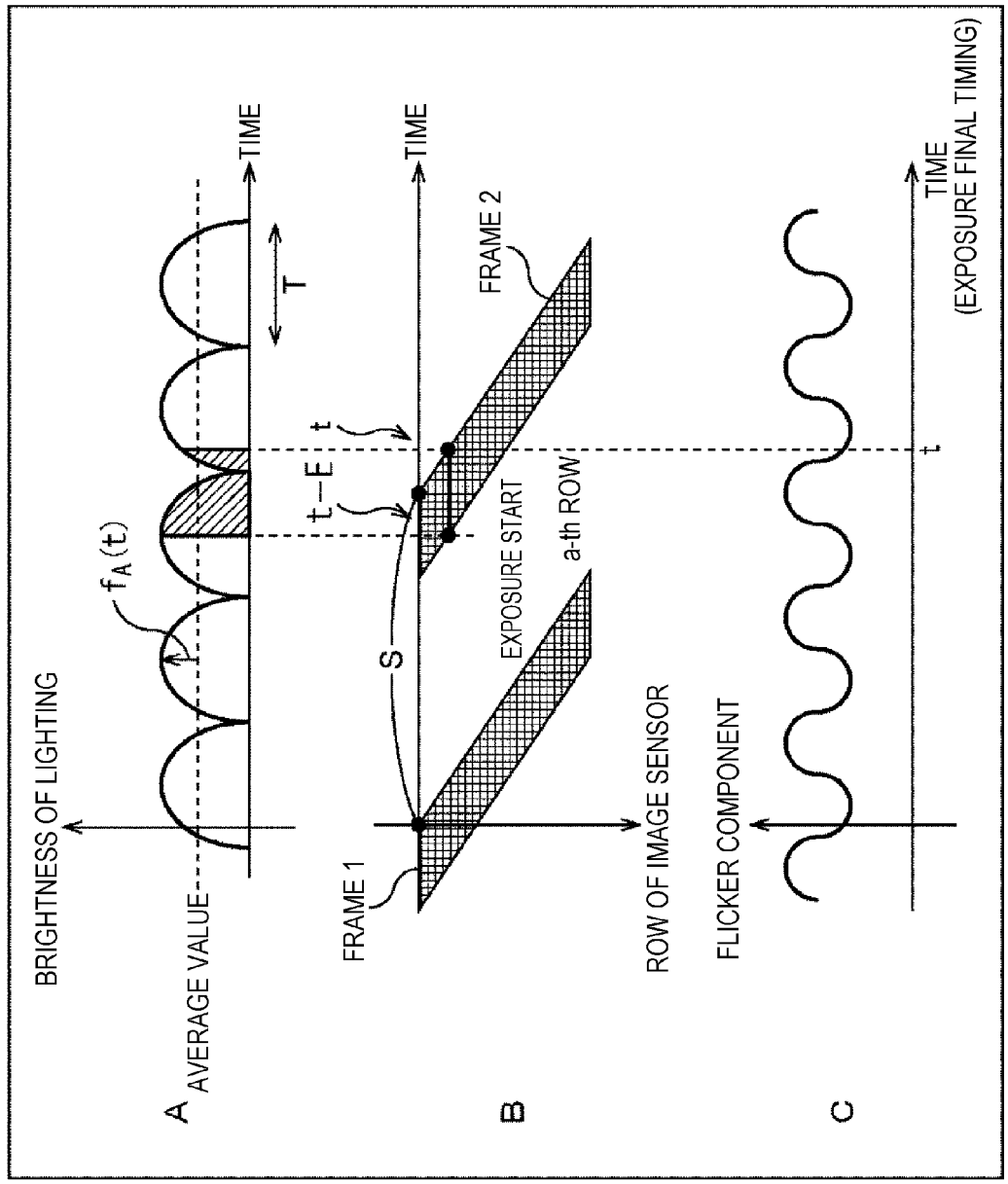
FIG. 1 is a diagram illustrated to describe flicker occurrence principle and flicker correction.

An image processing device described below can detect a region in which motion exists in an image without being affected by the flicker. It is also possible to generate an image that is unaffected by the flicker. Thus, the flick occurrence principle is described with reference to FIG. 1 and other drawings. In FIG. 1, the portion A represents a change in brightness of a lighting with time under the environment in which an image is captured with a camera. The commercial power supply is generally AC power supply of 50 or 60 Hz, and thus, illumination light such as fluorescent light is more likely to fluctuate at a frequency of 100 or 120 Hz.

The description is given by taking the flicker as an example, but the present technology described below is also applicable to noise that occurs at a predetermined frequency, such as flicker.

In the graph shown in the portion A of FIG. 1, the horizontal axis is time t and the vertical axis is the brightness of a lighting at each time t, f(t). The brightness of lighting at time t, f(t), is decomposed into an average value of the brightness of lighting, $f_D$, and variation from the average value of the brightness of lighting, $f_A(t)$, as expressed below.

$$F(t) = f_D + f_A(t) \quad (1)$$

The average value of the brightness of lighting $f_D$ is a constant value that is independent of time t, and the variation from average value $f_A(t)$ is a value that varies periodically according to the frequency of the lighting. Further, the following relationship is obtained, where f(t) is the brightness of lighting and T is the period of the brightness f(t).

[Math. 1]

$$f(t+T) = f(t)$$

$$\int_t^{t+T} f(\tau)d\tau = f_D$$

$$\int_t^{t+T} f_A(\tau)d\tau = 0 \quad (2)$$

In FIG. 1, the portion B illustrates schematically exposure timing of an image sensor in which an imaging timing is different for each row, like a CMOS image sensor. The horizontal axis represents time t and the vertical axis represents a row y of the image sensor. The example shown in the figure is an example of a case of capturing continuous image frames at a constant interval S, and illustrates exposure timings when two images of frame 1 and frame 2 are captured. In capturing each frame image, exposure is performed sequentially from the high-order row to the low-order row of the image sensor.

The exposure timings for capturing each frame image are different for each row of the image sensor, and thus the influence of the accumulated illumination light is also different for each row. As an example, it is assumed that the exposure time is set to E and an exposure end time for a predetermined pixel of the image sensor is set to t. If the sum of the illumination light during the exposure of the pixel under the condition that the influence of the flicker exists is assumed to be set to $F_A(t, E)$, $F_A(t, E)$ can be described as follows.

[Math. 2]

$$F_A(t,E) = \int_{t-E}^{t} f(\tau)d\tau = f_D \cdot E + \int_{t-E}^{t} f_A(\tau)d\tau \quad (3)$$

The sum of the illumination light under an ideal condition that no flicker occurs is set to $F_D(t, E)$. There is no influence of the flicker, and thus $F_D(t, E)$ becomes the variation from average value of the illumination light brightness, $f_A(t)=0$, which can be expressed below.

$$F_D(t,E) = f_D \times E \quad (4)$$

Here, "flicker component" is defined as a ratio of an image influenced by flicker to an ideal image with no flicker. The flicker component is equal to a ratio of the sum of the illumination light during accumulation in the pixel. Accordingly, the flicker component g(t, E) of the pixel at the exposure end time t in the image sensor of the exposure time E can be formulated as expressed in the following Formula (5).

[Math. 3]

$$g_t(t, E) = \frac{F_A(t, E)}{F_D(t, E)} = \frac{Ef_D + \int_{t-E}^{t} f_A(\tau)d\tau}{Ef_D} \quad (5)$$

In FIG. 1, the portion C is a diagram illustrating schematically the relationship between exposure end timing t for each pixel of an image shown on the horizontal axis and the flicker component g(t, E) shown on the vertical axis. The illumination light fluctuates periodically as described above, and accordingly the flicker component has periodicity. Thus, if once the flicker component g(t, E) can be calculated, the flicker component g(t, E) corresponding to all the exposure end timings t can be basically estimated.

As shown in the portion B of FIG. 1, the exposure end timing varies in units of rows of the image sensor. Thus, as shown in the portion C of FIG. 1, the flicker component g(t, E) is a value that varies with the exposure end timing T of each row.

Figure 2:
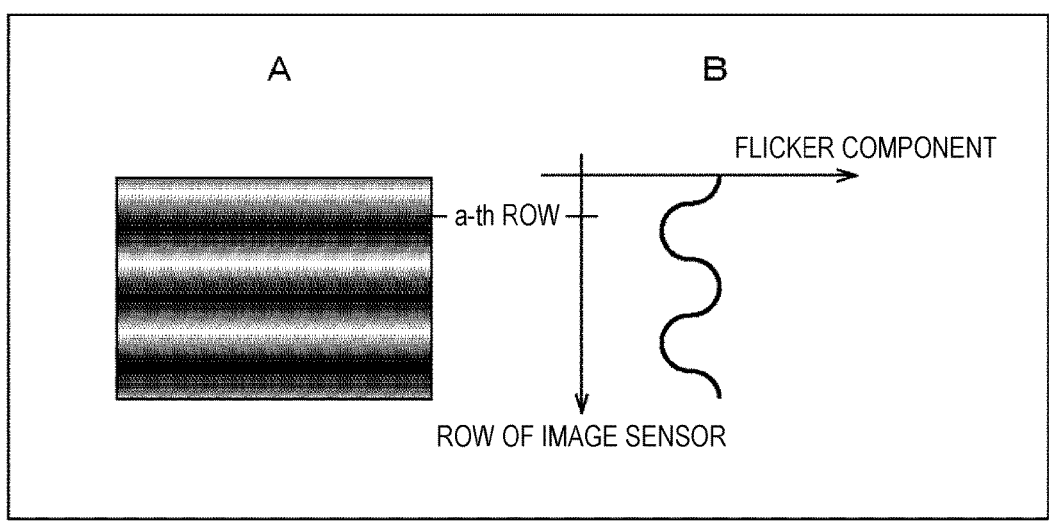
FIG. 2 is a diagram illustrated to describe flicker occurrence principle and flicker correction.

In FIG. 2, the portion A is a schematic diagram illustrating the influence of flicker occurring in an image outputted from an image sensor influenced by the flicker. The exposure end timing varies for each row, and thus a bright and dark stripe pattern in the row unit appears in the output image.

In FIG. 2, the portion B shows a graph of flick components, g(t0, y, E), for each row of the output image. The time to terminate the exposure for the first row is represented as t0, and a target row is represented as y. A data processing unit of the imaging device (camera) can calculate a flicker component g(t, E), which corresponds to the exposure end timing t based on the exposure time E for the image capturing and the exposure end timing t for each row y, as shown in the graph of the portion C in FIG. 1.

Specifically, the time unit ranging from the completion of exposure for a predetermined row to the completion of exposure for the subsequent row one line below is defined as 1 [line]. In this case, g(t0, y, E) and g(t, E) can be converted as follows:

$$g_y(t,y,E)=gt(t+y,E) \qquad (6)$$

The data processing unit of the imaging device (camera) can calculate the flicker component g(t, E) corresponding to the exposure end timing t from the graph shown in the portion C of FIG. 1, based on the exposure time E for the image capturing and the exposure end timing t for each row y. As one example, if the exposure end time in the a-th row shown in FIG. 2 is set to t, the flicker component g(t, E) corresponding to the exposure end timing t can be calculated from the graph shown in the portion C of FIG. 1. If the flicker component g(t, E) of the pixel at the exposure end time t in the image sensor of the exposure time E is known, a flicker component g(y) for each row of the image sensor can be estimated.

<Configuration of Imaging Device>

The image processing device to which the present technology is applied generates a high dynamic range image (HDR image) as one example. Thus, it receives (generate), as an input, a plurality of captured images which are set at different exposure times, generates a corrected image obtained by eliminating or removing a flicker component, and outputs it. The image processing device to which the present technology is applied composes the plurality of captured images which are set at different exposure times, generates a high dynamic range image to which more accurate pixel value is set from low brightness level to high brightness level, and outputs it.

The image processing device to which the present technology is applied generates a high dynamic range image using the plurality of images which are set at different exposure times, and performs a process for detecting a region in which motion exists and for outputting the information on the detection. Such image processing device will be described.

Figure 3:
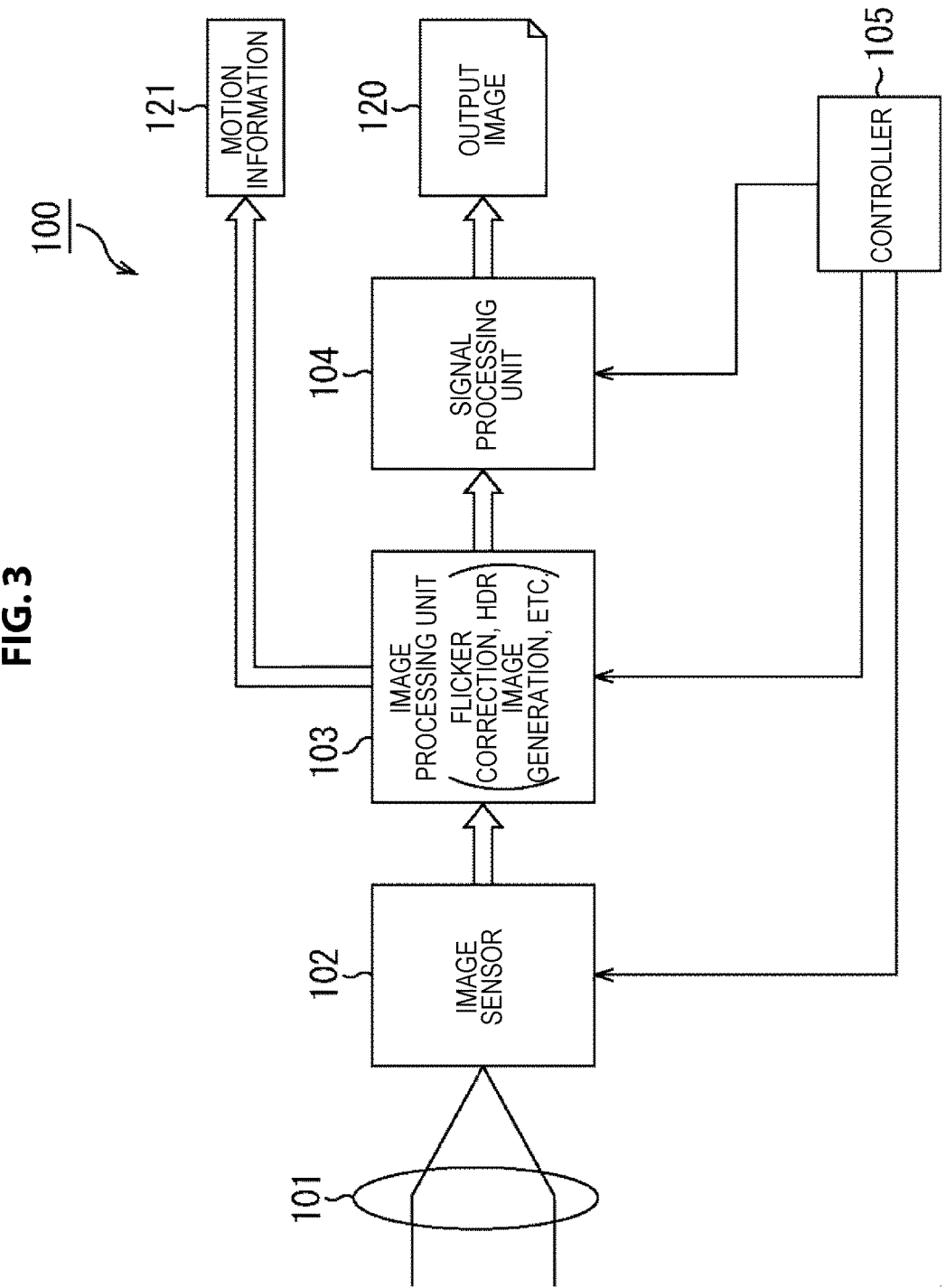
FIG. 3 is a diagram illustrating the configuration of an embodiment of an imaging device to which the present technology is applied.

FIG. 3 is a diagram illustrating the configuration of an embodiment of the imaging device to which the present technology is applied. This description will be given by taking an imaging device including the image processing device as an example.

An imaging device 100 shown in FIG. 3 is configured to include an optical lens 101, an image sensor 102, an image processing unit 103, a signal processing unit 104, and a controller 105. In the imaging device 100 shown in FIG. 3, the light passes through the optical lens 101, and is incident on an imaging unit, for example, the image sensor 102 composed of a CMOS image sensor. Then, the image sensor 102 outputs image data obtained by photoelectric conversion to the image processing unit 103.

The image outputted from the image sensor 102 is a so-called mosaic image in which any pixel value of RGB is assigned for each pixel. The image processing unit 103 performs a process for generating a high dynamic range (HDR) image based on the flicker correction process described above and a process for composing a long exposure image and a short exposure image.

The output from the image processing unit 103 is received by the signal processing unit 104 as an input. The signal processing unit 104 performs signal processing, such as white balance (WB) adjustment and gamma correction, in a generally used camera and generates an output image 120. The output image 120 is stored in a storage unit (not shown), or is outputted to a display unit. The image processing unit 103 also outputs motion information 121. The motion information 121 may be stored in a storage unit (not shown) or the like.

The controller 105 outputs a control signal to each component to control various types of processing in accordance with a program stored in a memory (not shown) as an example.

The imaging device 100 having the configuration described above according to the present technology is applicable to a monitoring camera or the like as one example. When it is applied to a monitoring camera, it is possible to detect a region in which motion exists from the captured image and to track this region.

According to the present technology, it is applicable to a monitoring camera that captures a place where a flicker component exists, for example, a place where a lighting is provided like the entrance of a building and checks the entry and exit of people. When a place where a lighting is provided is captured, by capturing an image in which a flicker component exists, a flicker component may be likely to be detected as motion, in such a case, which results in an erroneous detection.

According to the present technology described below, even in a shooting location where a flicker component exists, it is possible to detect a region in which motion exists without detecting the flicker component as motion.

An example of exposure control configuration of the image sensor 102 will be described with reference to FIG. 4. In the imaging device 100, the long exposure pixel and the short exposure pixel are set in units of pixels included in one captured image and the composition process between these pixels (a-blending), thereby generating a high dynamic range image. This exposure time control is performed under the control of the controller 105.

FIG. 4 is a diagram illustrating an example of exposure time setting by the image sensor 102. As shown in FIG. 4, the pixels that constitute the image sensor are divided into two types of pixels. The first exposure condition (short exposure) is set for one of the types and the second exposure condition (long exposure) is set for the other type.

In FIG. 4, the shaded pixels are images to be exposed under the first exposure condition, and the pixels that are not shaded are pixels to be exposed under the second exposure condition.

The pixel arrangement shown in FIG. 4 is the arrangement of R, G, and B pixels, which are arranged in an array of the first to eighth rows and the first to eighth columns. FIG. 4 illustrates only a portion of an image sensor. The arrangement of R, G, and B pixels arranged in an array of the first to eighth rows and the first to eighth columns is similar to R, G, and B pixels arranged in an array of other row and column.

In the following description, as one example, a pixel 200 (*m, n*) is used for the purpose of description, where m represents the row and n represents the column. The row is defined as the horizontal direction in which a horizontal signal line (not shown) is arranged, and the column is defined as the vertical direction in which a vertical signal line (not shown) is arranged. As one example, the pixel 200 (2, 1) represents a pixel located at the second row and the first column. The upper left pixel is defined as pixel 200 (1, 1), and the position of each pixel is represented on the basis of the pixel 200 (1, 1). This is similarly represented in other drawings.

The arrangement in the horizontal direction (left and right direction and row direction) of the image sensor will be described. On the first row, R pixel 200 (1, 1) and R pixel 200 (1, 5), which are exposed under the first exposure condition, are arranged. In addition, on the first row, G pixel 200 (1, 2), R pixel 200 (1, 3), G pixel 200 (1, 4), G pixel 200 (1, 6), R pixel 200 (1, 7), and G pixel 200 (1, 8), which are exposed under the second exposure condition, are also arranged.

On the second row, G pixel 200 (2, 1), G pixel 200 (2, 3), B pixel 200 (2, 4), G pixel 200 (2, 5), G pixel 200 (2, 7), and B pixel 200 (2, 8), which are exposed under the first exposure condition, are arranged. On the second row, B pixel 200 (2, 2) and B pixel 200 (2, 6), which are exposed under the second exposure condition, are also arranged.

On the third row, R pixel 200 (3, 3) and R pixel 200 (3, 7), which are exposed under the first exposure condition, are arranged. On the third row, R pixel 200 (3, 1), G pixel 200 (3, 2), G pixel 200 (3, 4), R pixel 200 (3, 5), G pixel 200 (3, 7), and G pixel 200 (3, 8), which are exposed under the second exposure condition, are also arranged.

On the fourth row, G pixel 200 (4, 1), B pixel 200 (4, 2), G pixel 200 (4, 3), G pixel 200 (4, 5), B pixel 200 (4, 6), and G pixel 200 (4, 7), which are exposed under the first exposure condition, are arranged. On the fourth row, B pixel 200 (4, 4) and B pixel 200 (4, 8), which are exposed under the second exposure condition, are also arranged.

The fifth row is the same as the first row, the sixth row is the same as the second row, the seventh row is the same as the third row, and the eighth row is the same as the fourth row. On these rows, the respective corresponding R, G, and B pixels are arranged.

The following description will be given by taking the pixel arrangement shown in FIG. 4 as an example, but the present technology is not limited to the application to the pixel arrangement shown in FIG. 4 and is applicable to other pixel arrangements. Examples of other pixel arrangements will be described with reference to FIGS. 5 to 12.

Figure 5:
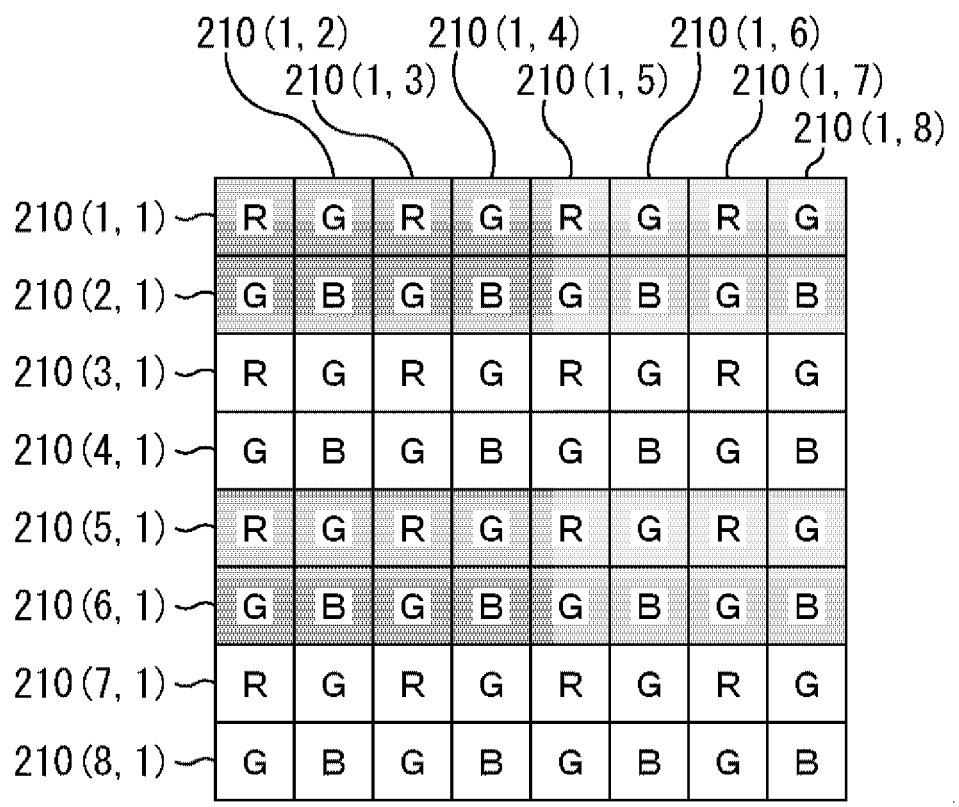
FIG. 5 is a diagram illustrating an exemplary arrangement of pixels in which different exposure times are set.

FIG. 5 is a diagram illustrating another example of the pixel arrangement. In the pixel arrangement shown in FIG. 5, on the first row, R pixel 210 (1, 1), G pixel 210 (1, 2), R pixel 210 (1, 3), G pixel 210 (1, 4), R pixel 210 (1, 5), G pixel 210 (1, 6), R pixel 210 (1, 7), and G pixel 210 (1, 8), which are exposed under the first exposure condition, are arranged.

In this case, on the first row, R and G pixels are arranged alternately, and all the pixels are pixels that are exposed under the first exposure condition (short exposure).

On the second row, G pixel 210 (2, 1), B pixel 210 (2, 2), G pixel 210 (2, 3), B pixel 210 (2, 4), G pixel 210 (2, 5), B pixel 210 (2, 6), G pixel 210 (2, 7), and B pixel 210 (2, 8), which are exposed under the first exposure condition, are arranged.

In this case, on the second row, G and B pixels are arranged alternately, and all the pixels are pixels that are exposed under the first exposure condition (short exposure).

On the third row, R pixel 210 (3, 1), G pixel 210 (3, 2), R pixel 210 (3, 3), G pixel 210 (3, 4), R pixel 210 (3, 5), G pixel 210 (3, 6), R pixel 210 (3, 7), and G pixel 210 (3, 8), which are exposed under the second exposure condition, are arranged.

In this case, on the third row, R and G pixels are arranged alternately, and all the pixels are pixels that are exposed under the second exposure condition (long exposure).

On the fourth row, G pixel 210 (4, 1), B pixel 210 (4, 2), G pixel 210 (4, 3), B pixel 210 (4, 4), G pixel 210 (4, 5), B pixel 210 (4, 6), G pixel 210 (4, 7), and B pixel 210 (4, 8), which are exposed under the second exposure condition, are arranged.

In this case, on the third row, G and B pixels are arranged alternately, and all the pixels are pixels that are exposed under the second exposure condition (long exposure).

The fifth row is the same as the first row, the sixth row is the same as the second row, the seventh row is the same as the third row, and the eighth row is the same as the fourth row. On these rows, the respective corresponding R, G, and B pixels are arranged.

The present technology is also applicable to such a pixel arrangement.

Figure 6:
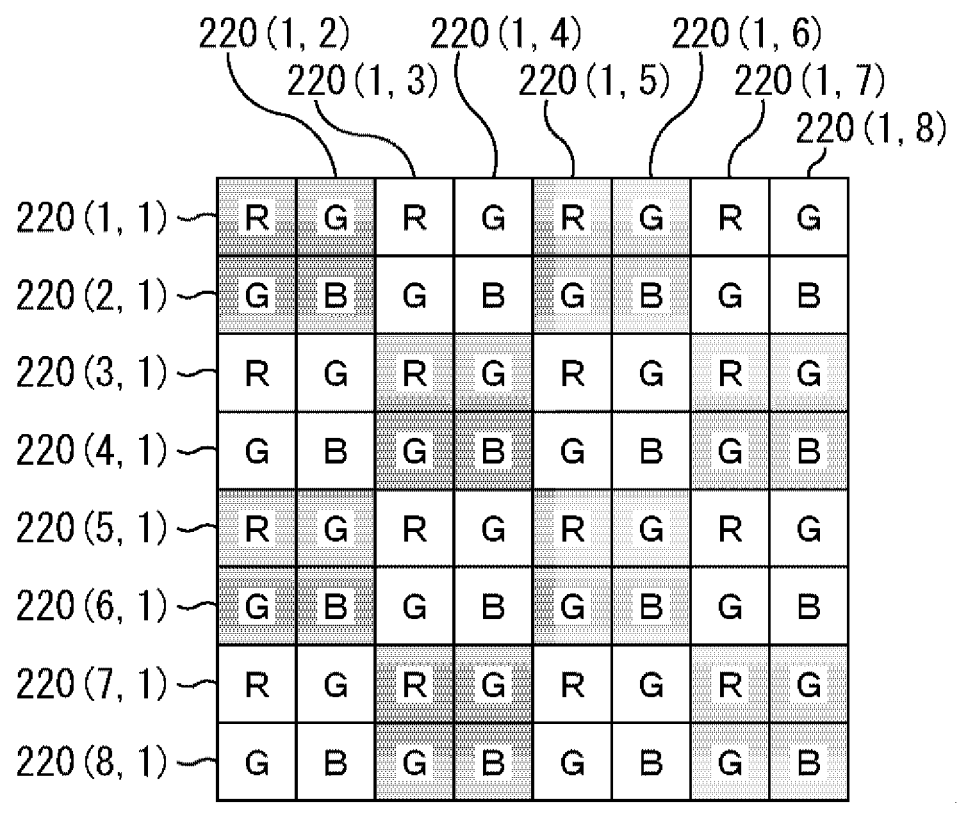

FIG. 6 is a diagram illustrating another example of the pixel arrangement. In the pixel arrangement shown in FIG. 6, on the first row, R pixel 220 (1, 1), G pixel 220 (1, 2), R pixel 220 (1, 5), and G pixel 220 (1, 6), which are exposed under the first exposure condition, are arranged. In addition, on the first row, R pixel 220 (1, 3), G pixel 220 (1, 4), R pixel 220 (1, 7), and G pixel 220 (1, 8), which are exposed under the second exposure condition, are also arranged.

In this case, on the first row, R and G pixels are arranged alternately. In each of R and G pixels, pixels exposed under the first exposure condition and pixels exposed under the second exposure condition are arranged alternately.

On the second row, G pixel 220 (2, 1), B pixel 220 (2, 2), G pixel 220 (2, 5), and B pixel 220 (2, 6), which are exposed under the first exposure condition, are arranged. In addition, on the second row, G pixel 220 (2, 3), B pixel 220 (2, 4), G pixel 220 (2, 7), and B pixel 220 (2, 8), which are exposed under the second exposure condition, are also arranged.

In this case, on the second row, G and B pixels are arranged alternately. In each of G and B pixels, pixels exposed under the first exposure condition and pixels exposed under the second exposure condition are arranged alternately.

The third row is different from the first row in that it starts from R pixel 220 (3, 1) and G pixel 220 (3, 2) which are exposed under the first exposure condition. However, R and G pixels are arranged alternately and each of R and G pixels has pixels exposed under the first exposure condition and pixels exposed under the second exposure condition which are arranged alternately, which is the same as the first row.

The fourth row is different from the second row in that it starts from G pixel 220 (4, 1) and B pixel 220 (4, 2) which are exposed under the second exposure condition. However, G and B pixels are arranged alternately and each of G and B pixels has pixels exposed under the first exposure condition and pixels exposed under the second exposure condition which are arranged alternately, which is the same as the second row.

The fifth row is the same as the first row, the sixth row is the same as the second row, the seventh row is the same as the third row, and the eighth row is the same as the fourth row. On these rows, the respective corresponding R, G, and B pixels are arranged.

The present technology is also applicable to such a pixel arrangement.

Figure 7:
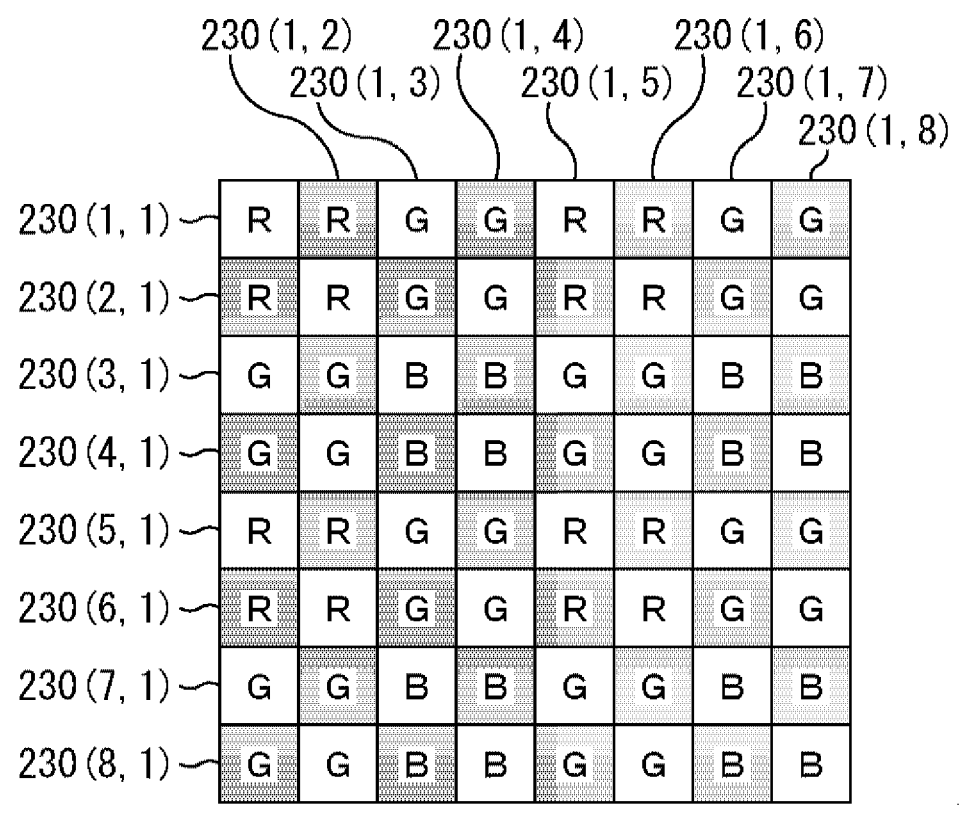

FIG. 7 is a diagram illustrating another example of the pixel arrangement. In the pixel arrangement shown in FIG. 7, four pixels in two rows by two columns have the same color, and the pixels under the first exposure condition and the pixels under the second exposure condition are arranged in a checker array.

In the pixels of two by two arranged in the first and second rows, four pixels of R pixel 230 (1, 1), R pixel 230 (1, 2), R pixel 230 (2, 1), and R pixel 230 (2, 2) are R (red) pixels. The R pixel 230 (1, 1) and the R pixel 230 (2, 2) are pixels exposed under the second exposure condition. The R pixel 230 (1, 2) and the R pixel 230 (2, 1) are pixels exposed under the first exposure condition. A set of four red-color pixels arranged as described above is referred to as "R pixel block".

In four pixels of two by two which are arranged in the first and second rows and are adjacent to the R pixel block, four pixels of G pixel 230 (1, 3), G pixel 230 (1, 4), G pixel 230 (2, 3), and G pixel 230 (2, 4) are G (green) pixels. The G pixel 230 (1, 3) and the G pixel 230 (2, 4) are pixels exposed under the second exposure condition. The G pixel 230 (1, 4) and the G pixel 230 (2, 3) are pixels exposed under the first exposure condition. A set of four green-color pixels arranged as described above is referred to as "G pixel block".

On the first and second rows, the R pixel block and the G pixel block are arranged alternately.

On the third and fourth rows, a G pixel block that is composed of G pixel 230 (3, 1), G pixel 230 (3, 2), G pixel 230 (4, 1), and G pixel 230 (4, 2) is arranged.

In four pixels of two by two which are arranged in the third and fourth rows and are adjacent to the G pixel block, four pixels of B pixel 230 (3, 3), B pixel 230 (3, 4), B pixel 230 (4, 3), and B pixel 230 (4, 4) are B (green) pixels. The B pixel 230 (3, 3) and the B pixel 230 (4, 4) are pixels exposed under the second exposure condition. The B pixel 230 (3, 4) and the B pixel 230 (4, 3) are pixels exposed under the first exposure condition. A set of four blue-color pixels arranged as described above is referred to as "B pixel block".

On the third and fourth rows, the G pixel block and the B pixel block are arranged alternately.

The fifth and sixth rows are the same as the first and second rows, respectively, and the R pixel block and the G pixel block are arranged alternately. The seventh and eighth rows are the same as the third and fourth rows, respectively, and the G pixel block and the B pixel block are arranged alternately.

The present technology is also applicable to such a pixel arrangement.

Figure 8:
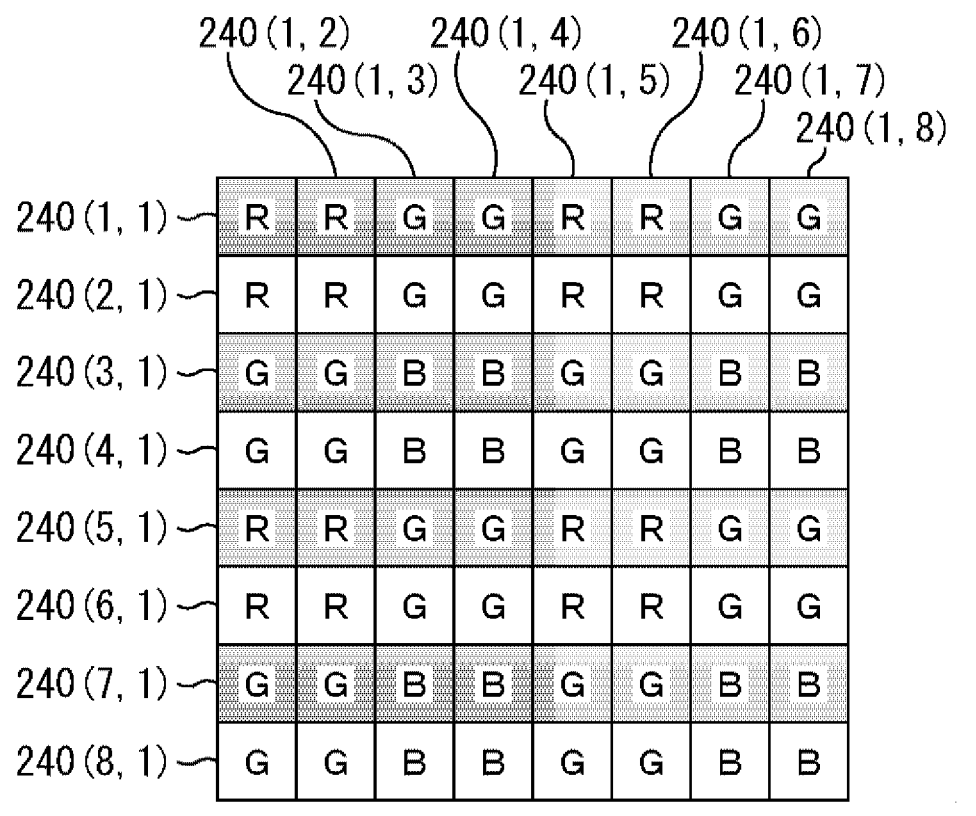

FIG. 8 is a diagram illustrating another example of the pixel arrangement. The pixel arrangement shown in FIG. 8 is the same in color arrangement as that shown in FIG. 7. However, the pixel arrangement shown in FIG. 8 is different from that shown in FIG. 7 in that the pixels are arranged with different exposure conditions.

In four pixels of two by two which are arranged in the first and second rows, R pixel 240 (1, 1), R pixel 240 (1, 2), R pixel 240 (2, 1), and R pixel 240 (2, 2) constitute an R' pixel block. In four pixels of the R' pixel block, the R pixel 240 (1, 1) and the R pixel 240 (1, 2) are pixels exposed under the first exposure condition, and the R pixel 240 (2, 1) and the R pixel 240 (2, 2) are pixels exposed under the second exposure condition.

In four pixels of two by two which are arranged in the first and second rows and are adjacent to the R' pixel block, G pixel 240 (1, 3), G pixel 240 (1, 4), G pixel 240 (2, 3), and G pixel 240 (2, 4) constitute a G' pixel block. In four pixels of the G' pixel block, the G pixel 240 (1, 3) and the G pixel 240 (1, 4) are pixels exposed under the first exposure condition, and the G pixel 240 (2, 3) and the G pixel 240 (2, 4) are pixels exposed under the second exposure condition.

On the third and fourth rows, the G' pixel block composed of G pixel 240 (3, 1), G pixel 240 (3, 2), G pixel 240 (4, 1), and G pixel 240 (4, 2) is arranged.

In four pixels of two by two which are arranged in the third and fourth rows and are adjacent to the G' pixel block, B pixel 240 (3, 3), B pixel 240 (3, 4), B pixel 240 (4, 3), and B pixel 240 (4, 4) constitute a B' pixel block. In four pixels of the B' pixel block, the B pixel 240 (3, 3) and the B pixel 240 (3, 4) are pixels exposed under the first exposure condition, and the B pixel 240 (4, 3) and the B pixel 240 (4, 4) are pixels exposed under the second exposure condition.

The fifth and sixth rows are the same as the first and second rows, respectively, and the R' pixel block and the G' pixel block are arranged alternately. The seventh and eighth rows are the same as the third and fourth rows, respectively, and the G' pixel block and the B' pixel block are arranged alternately.

In the pixel arrangement shown in FIG. 8, pixels exposed under the first exposure condition are arranged on the odd rows, and pixels exposed under the second exposure condition are arranged on the even rows.

The present technology is also applicable to such a pixel arrangement.

Figure 9:
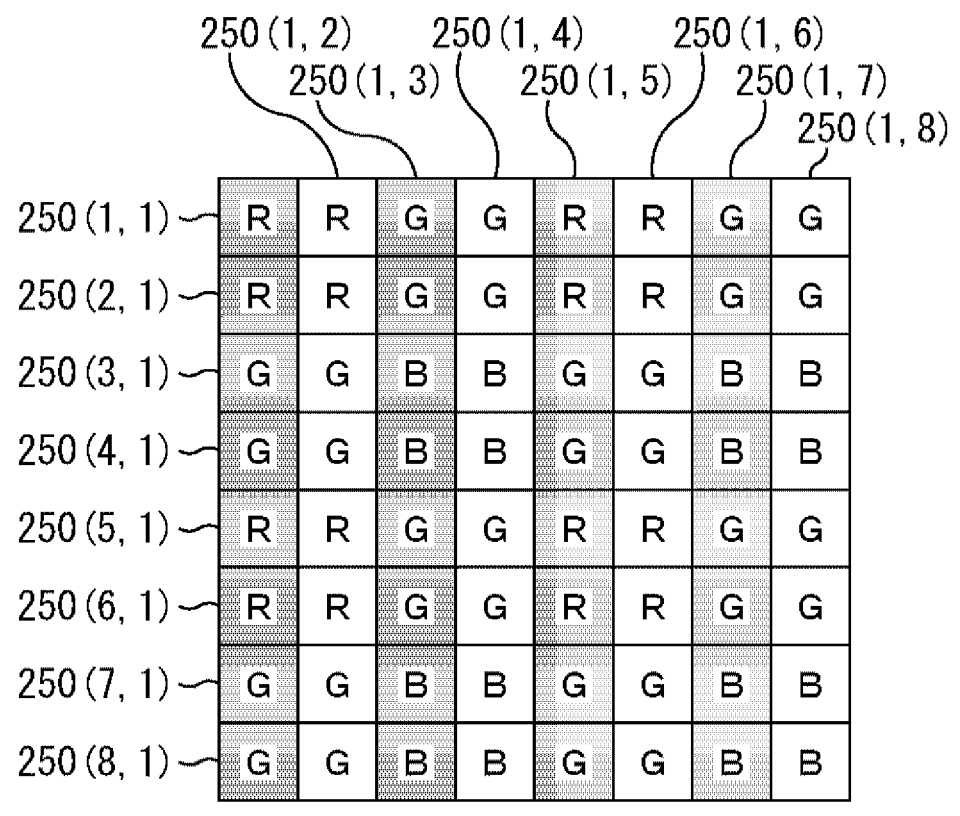

FIG. 9 is a diagram illustrating another example of the pixel arrangement. The pixel arrangement shown in FIG. 9 is the same in color arrangement as that shown in FIG. 7. However, the pixel arrangement shown in FIG. 9 is different from that shown in FIG. 7 in that the pixels are arranged with different exposure conditions.

In four pixels of two by two which are arranged in the first and second rows, R pixel 250 (1, 1), R pixel 250 (1, 2), R pixel 250 (2, 1), and R pixel 250 (2, 2) constitute a R" pixel block. In four pixels of the R" pixel block, the R pixel 250 (1, 1) and the R pixel 250 (2, 1) are pixels exposed under the first exposure condition, and the R pixel 250 (1, 2) and the R pixel 250 (2, 2) are pixels exposed under the second exposure condition.

In four pixels of two by two which are arranged in the first and second rows and are adjacent to the R" pixel block, G pixel 250 (1, 3), G pixel 250 (1, 4), G pixel 250 (2, 3), and G pixel 250 (2, 4) constitute a G" pixel block. In four pixels of the G' pixel block, the G pixel 250 (1, 3) and the G pixel 250 (2, 3) are pixels exposed under the first exposure condition, and the G pixel 250 (1, 4) and the G pixel 250 (2, 4) are pixels exposed under the second exposure condition.

On the third and fourth rows, a G" pixel block that is composed of G pixel 250 (3, 1), G pixel 250 (3, 2), G pixel 250 (4, 1), and G pixel 250 (4, 2) is arranged.

In four pixels of two by two which are arranged in the third and fourth rows and are adjacent to the G" pixel block, B pixel 250 (3, 3), B pixel 250 (3, 4), B pixel 250 (4, 3), and B pixel 250 (4, 4) constitute a B' pixel block. In four pixels of the B" pixel block, the B pixel 250 (3, 3) and the B pixel 250 (4, 3) are pixels exposed under the first exposure condition, and the B pixel 250 (3, 4) and the B pixel 250 (4, 4) are pixels exposed under the second exposure condition.

The fifth and sixth rows are the same as the first and second rows, respectively, and the R" pixel block and the G" pixel block are arranged alternately. The seventh and eighth rows are the same as the third and fourth rows, respectively, and the G" pixel block and the B" pixel block are arranged alternately.

In the pixel arrangement shown in FIG. 9, pixels exposed under the first exposure condition are arranged on the odd rows, and pixels exposed under the second exposure condition are arranged on the even rows.

The present technology is also applicable to such a pixel arrangement.

Figure 10:
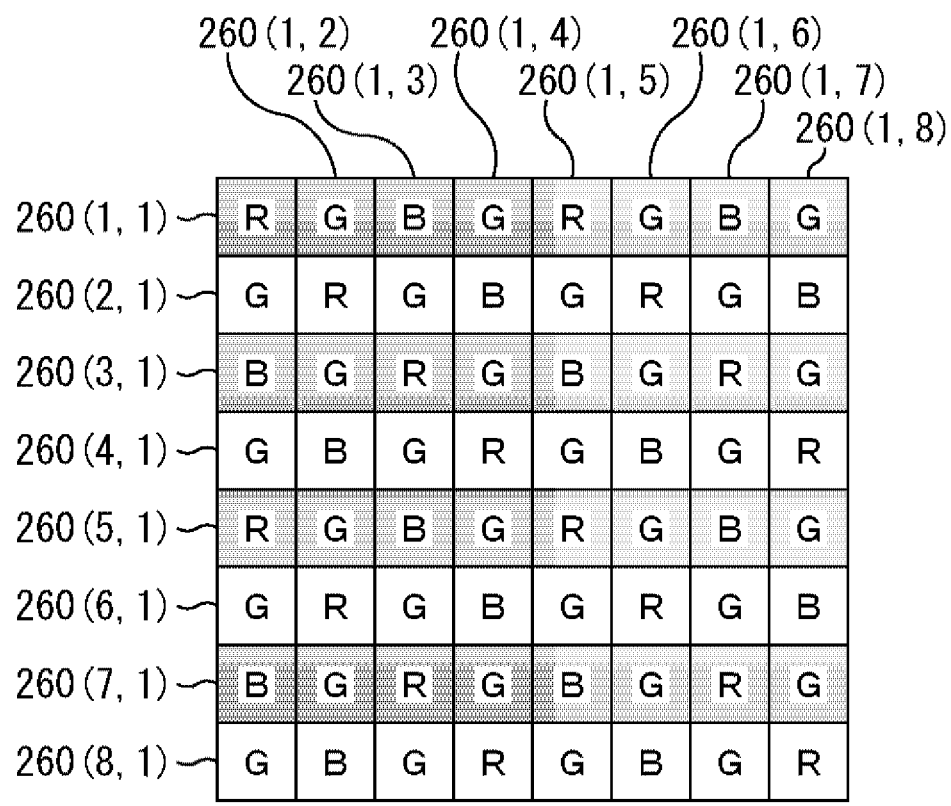
FIG. 10 is a diagram illustrating an exemplary arrangement of pixels in which different exposure times are set.

FIG. 10 is a diagram illustrating another example of the pixel arrangement. In the pixel arrangement shown in FIG. 10, on the first row, R pixel 260 (1, 1), G pixel 260 (1, 2), B pixel 260 (1, 3), G pixel 260 (1, 4), R pixel 260 (1, 5), G pixel 260 (1, 6), R pixel 260 (1, 7), and G pixel 260 (1, 8), which are exposed under the first exposure condition, are arranged.

In this case, on the first row, R, G, and B pixels are arranged, and all the pixels are exposed under the first exposure condition (short exposure).

On the second row, G pixel 260 (2, 1), R pixel 260 (2, 2), G pixel 260 (2, 3), B pixel 260 (2, 4), G pixel 260 (2, 5), R pixel 260 (2, 6), G pixel 260 (2, 7), and B pixel 260 (2, 8), which are exposed under the second exposure condition, are arranged.

In this case, on the second row, R, G, and B pixels are arranged, and all the pixels are exposed under the second exposure condition (long exposure).

On the third row, G pixel 260 (3, 1), B pixel 260 (3, 2), R pixel 260 (3, 3), G pixel 260 (3, 4), G pixel 260 (3, 5), B pixel 260 (3, 6), R pixel 260 (3, 7), and G pixel 260 (3, 8), which are exposed under the first exposure condition, are arranged.

In this case, on the third row, R, G, and B pixels are arranged, and all the pixels are exposed under the first exposure condition (short exposure).

On the fourth row, G pixel 260 (4, 1), B pixel 260 (4, 2), G pixel 260 (4, 3), R pixel 260 (4, 4), G pixel 260 (4, 5), B pixel 260 (4, 6), G pixel 260 (4, 7), and R pixel 260 (4, 8), which are exposed under the second exposure condition, are arranged.

In this case, on the fourth row, R, G, and B pixels are arranged, and all the pixels are exposed under the second exposure condition (long exposure).

The fifth row is the same as the first row, the sixth row is the same as the second row, the seventh row is the same as the third row, and the eighth row is the same as the fourth row. On these rows, the respective corresponding R, G, and B pixels are arranged.

The present technology is also applicable to such a pixel arrangement.

Figure 11:
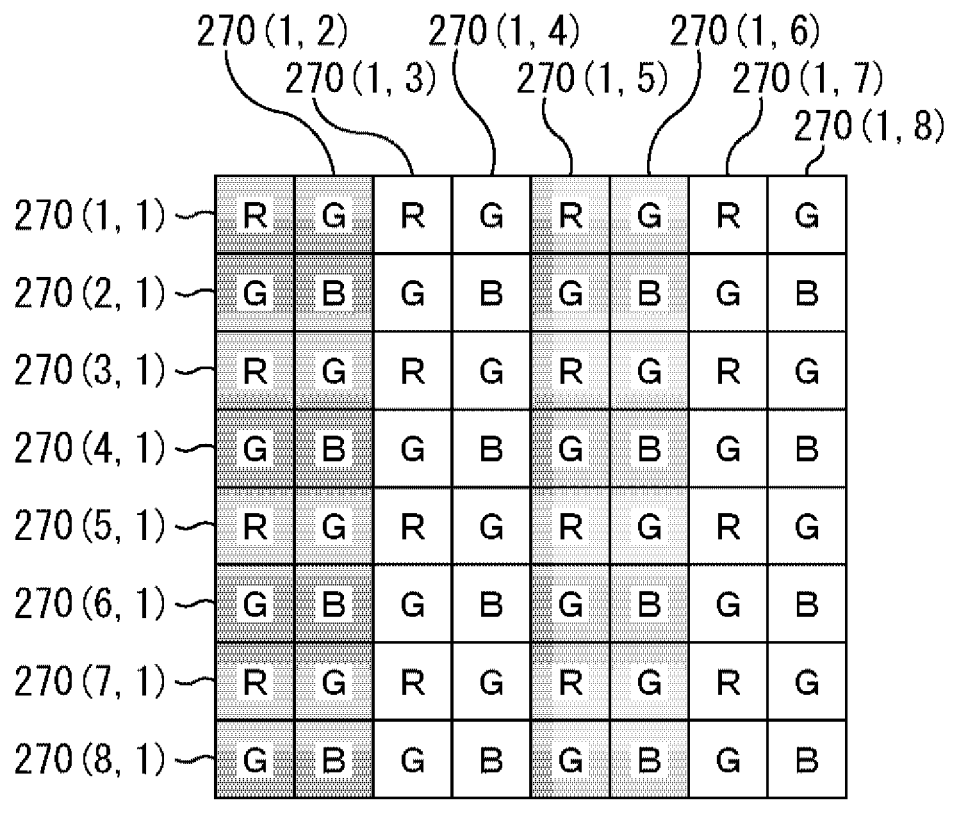

FIG. 11 is a diagram illustrating another example of the pixel arrangement. In the pixel arrangement shown in FIG. 11, pixels exposed under the first exposure condition and pixels exposed under the second exposure condition are arranged in the column direction, and thus this description will be mainly focused on the array in the column direction.

On the first row of the pixel arrangement shown in FIG. 11, R pixel 270 (1, 1), G pixel 270 (2, 1), R pixel 270 (3, 1), G pixel 270 (4, 1), R pixel 270 (5, 1), G pixel 270 (6, 1), R pixel 270 (7, 1), and G pixel 270 (8, 1), which are exposed under the first exposure condition, are arranged.

In this case, on the first column, R and G pixels are arranged, and all the pixels are pixels exposed under the first exposure condition (short exposure).

On the second column, G pixel 270 (1, 2), B pixel 270 (2, 2), G pixel 270 (3, 2), B pixel 270 (4, 2), G pixel 270 (5, 2), B pixel 270 (6, 2), G pixel 270 (7, 2), and B pixel 270 (8, 2), which are exposed under the first exposure condition, are arranged.

In this case, on the second column, G and B pixels are arranged, and all the pixels are pixels exposed under the first exposure condition (short exposure).

On the third column, R pixel 270 (1, 3), G pixel 270 (2, 3), R pixel 270 (3, 3), G pixel 270 (4, 3), R pixel 270 (5, 3), G pixel 270 (6, 3), R pixel 270 (7, 3), and G pixel 270 (8, 3), which are exposed under the second exposure condition, are arranged.

In this case, on the third column, R and G pixels are arranged, and all the pixels are pixels exposed under the second exposure condition (long exposure).

On the fourth column, G pixel 270 (1, 4), B pixel 270 (2, 4), G pixel 270 (3, 4), B pixel 270 (4, 4), G pixel 270 (5, 4), B pixel 270 (6, 4), G pixel 270 (7, 4), and B pixel 270 (8, 4), which are exposed under the second exposure condition, are arranged.

In this case, on the fourth column, G and B pixels are arranged, and all the pixels are pixels exposed under the second exposure condition (long exposure).

The fifth column is the same as the first column, the sixth column is the same as the second column, the seventh column is the same as the third column, and the eighth column is the same as the fourth column. On these columns, the respective corresponding R, G, and B pixels are arranged.

The present technology is also applicable to such a pixel arrangement.

Figure 12:
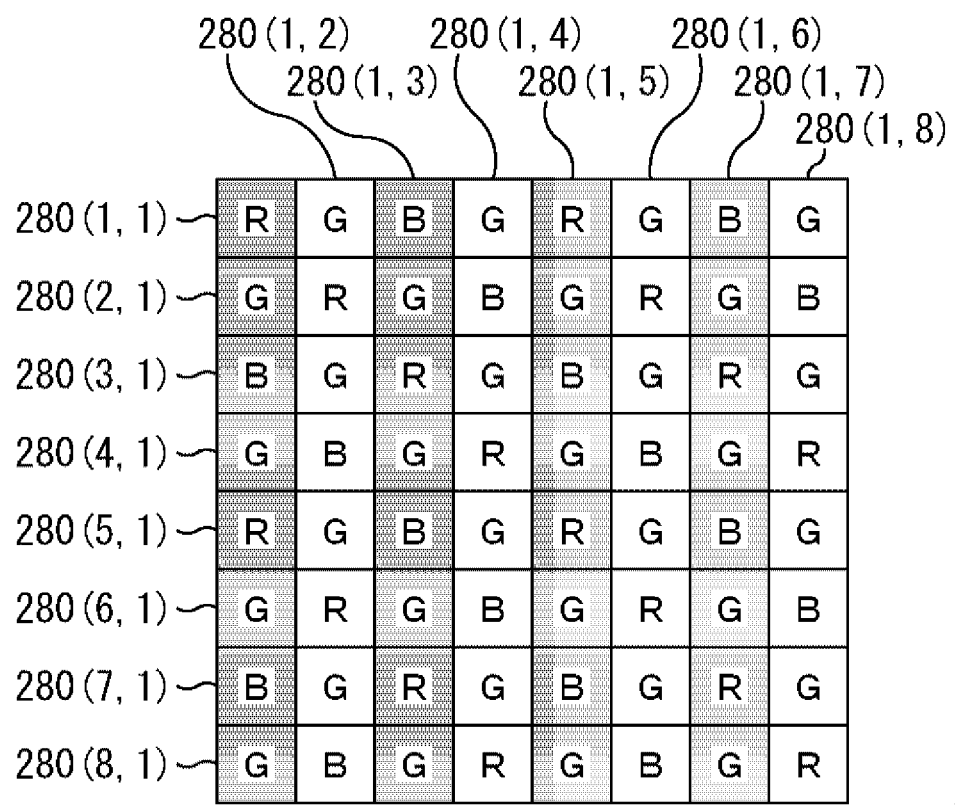
FIG. 12 is a diagram illustrating an exemplary arrangement of pixels in which different exposure times are set.

FIG. 12 is a diagram illustrating another example of the pixel arrangement. In the pixel arrangement shown in FIG. 12, pixels exposed under the first exposure condition and pixels exposed under the second exposure condition are arranged in the column direction, and thus this description will be mainly focused on the array in the column direction.

On the first row of the pixel arrangement shown in FIG. 12, R pixel 280 (1, 1), G pixel 280 (2, 1), R pixel 280 (3, 1), G pixel 280 (4, 1), R pixel 280 (5, 1), G pixel 280 (6, 1), B pixel 280 (7, 1), and G pixel 280 (8, 1), which are exposed under the first exposure condition, are arranged.

In this case, on the first column, R, G, and B pixels are arranged, and all the pixels are pixels exposed under the first exposure condition (short exposure).

On the second column, G pixel 280 (1, 2), R pixel 280 (2, 2), G pixel 280 (3, 2), B pixel 280 (4, 2), G pixel 280 (5, 2), R pixel 280 (6, 2), G pixel 280 (7, 2), and B pixel 280 (8, 2), which are exposed under the second exposure condition, are arranged.

In this case, on the second column, R, G, and B pixels are arranged, and all the pixels are exposed under the second exposure condition (long exposure).

On the third column, B pixel 280 (1, 3), G pixel 280 (2, 3), R pixel 280 (3, 3), G pixel 280 (4, 3), B pixel 280 (5, 3), G pixel 280 (6, 3), R pixel 280 (7, 3), and G pixel 280 (8, 3), which are exposed under the first exposure condition, are arranged.

In this case, on the third column, R, G, and B pixels are arranged, and all the pixels are pixels exposed under the first exposure condition (short exposure).

On the fourth column, G pixel 280 (1, 4), B pixel 280 (2, 4), G pixel 280 (3, 4), R pixel 280 (4, 4), G pixel 280 (5, 4), B pixel 280 (6, 4), G pixel 280 (7, 4), and R pixel 280 (8, 4), which are exposed under the second exposure condition, are arranged.

In this case, on the fourth column, R, G, and B pixels are arranged, and all the pixels are exposed under the second exposure condition (long exposure).

The fifth column is the same as the first column, the sixth column is the same as the second column, the seventh column is the same as the third column, and the eighth column is the same as the fourth column. On these columns, the respective corresponding R, G, and B pixels are arranged.

The present technology is also applicable to such a pixel arrangement.

As described above, the present technology is applicable to an imaging device, and specifically, is applicable to an imaging device including a charge-coupled device (CCD) sensor, complementary metal-oxide-semiconductor (CMOS) sensor, or the like as an image sensor provided in the imaging device. It is applicable to an image sensor in which three pixels that output respective color light of R (red), G (green), and B (blue) are arranged. Furthermore, it is applicable to an image sensor in which four pixels that output respective color light of R (red), G (green), B (blue), and W (white) are arranged.

The four pixels that output respective color light of R (red), G (green), B (blue), and W (white) are arranged in a matrix form, as one example, on a display area. The W pixel functions as a pixel with panchromatic spectral sensitivity, and the R, G, and B pixels each functions as a pixel with spectral sensitivity of individual color property.

The present technology is also applicable to the RGBW pixel arrangement as described above, in addition to the RGB pixel arrangement.

The pixel arrangements described with reference to FIGS. 4 to 12 are only illustrative, and the present technology is applicable to other pixel arrangements not described herein.

The description will be given by taking a case where, upon capturing one image, short exposure (first exposure condition) and long exposure (second exposure condition) are simultaneously captured. However, the present technology is applicable to a case where a pixel for short exposure and a pixel for long exposure in a normal image are captured alternately and a pixel at the time of short exposure and a pixel at the time of long exposure are acquired without being divided into a pixel for short exposure and a pixel for long exposure.

In the example described above, the description has been given by taking, as an example, the imaging device that performs image capturing at two kinds of exposure times of the short exposure and the long exposure, but the present technology is applicable to an imaging device including a combination of images captured at three or more exposure times.

In the embodiment described above, the description has been given by taking, as an example, the case where the spectral sensitivity of the image sensor is RGB or RGB+W, but the type of the spectral sensitivity is not a constraint for the use of the present technology. In other words, a pixel with spectral sensitivity other than the RGB or RGB+W may be used. As one example, a combination of four rows obtained by adding G to complementary color system of Y (yellow), C (cyan), and M (magenta) may be used.

The following description will be given by taking, as an example, the pixel arrangement shown in FIG. 4.

Figure 13:
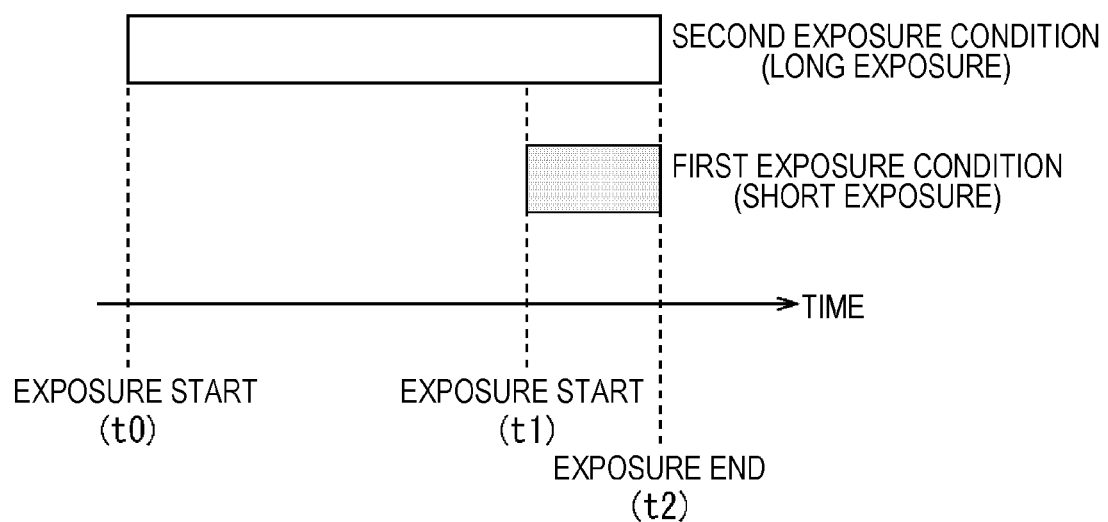
FIG. 13 is a diagram illustrated to describe different exposure times.

FIG. 13 illustrates an example of setting the exposure time for each pixel. A pixel for which the first exposure condition (short exposure) is set is subject to a short exposure process. A pixel for which the second exposure condition (long exposure) is set is subject to a long exposure process. Such control of exposure in units of pixels is performed, as one example, by allowing the controller 105 of the imaging device 100 shown in FIG. 3 to output a control signal to the image sensor 102.

<Configuration of Image Processing Unit According to First Embodiment>

The configuration of the image processing unit 103 (FIG. 3) will be described. In the image processing unit 103, a portion for detecting motion information 121 (FIG. 3) is mainly described.

Figure 14:
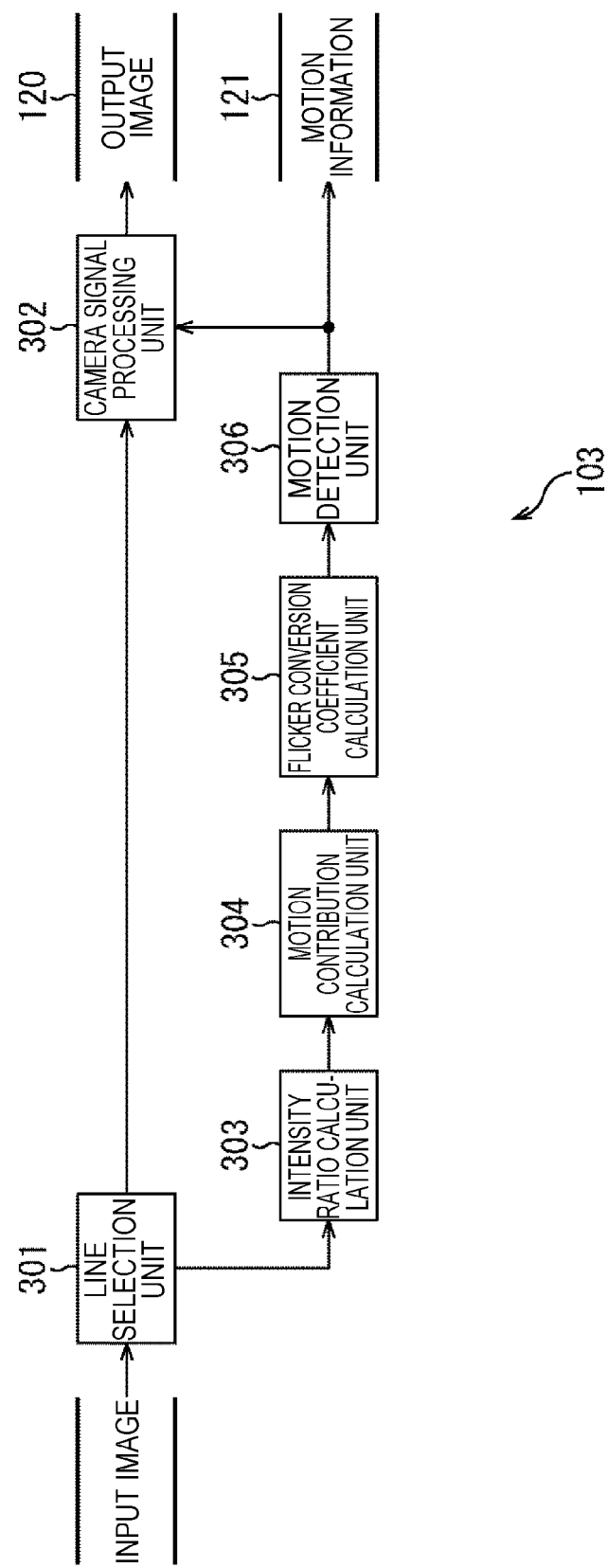
FIG. 14 is a diagram illustrating the configuration of an image processing unit according to a first embodiment.

FIG. 14 is a diagram illustrating the configuration of the image processing unit 103 according to the first embodiment. The image processing unit 103 is configured to include a line selection unit 301, a camera signal processing unit 302, an intensity ratio calculation unit 303, a motion contribution calculation unit 304, a flicker conversion coefficient calculation unit 305, and a motion detection unit 306.

The line selection unit 301 receives one RAW image in which a plurality of exposures outputted from the image sensor 102 (FIG. 3) exist together spatially, for example, an image captured using the pixel arrangement shown in FIG. 4 as an input. The line selection unit 301 may receive one image, as an input, in which an image of the long exposure and an image of short exposure captured using the pixel arrangement shown in FIG. 4 exist together. Alternatively, the line selection unit 301 may receive two images, as an input, of an image of the long exposure and an image of short exposure captured at different timings.

The description is given by taking long exposure and short exposure as an example. However, it is also possible to set different exposure times and to allow the line selection unit 301 to receive a plurality of RAW images captured at a plurality of exposure times as an input.

The line selection unit 301 selects one line (row) or sequentially selects a plurality of lines including the neighbors, from the inputted RAW image (hereinafter, referred to simply as image). The description is given on the assumption that one line is selected. The line herein is not a line in the vertical direction but a line in the horizontal direction, unless otherwise noted.

The intensity ratio calculation unit 303 calculates an intensity ratio at each point in the horizontal direction of the line selected by the line selection unit 301. The intensity ratio is assumed to be a ratio obtained by normalizing each value of two kinds of exposures, the long exposure and the short exposure herein. A pixel value of the captured image may be used without any modification, or a signal value calculated from the pixel value including peripheral regions. The description will be given on the assumption that the pixel value is used. The following Formula (6) shows a formula of calculating the intensity ratio.

[Math. 4]

$$F_i = \frac{V_i^A \times ExpRatio}{V_i^B} \quad (6)$$

$$ExpRatio = \frac{shutter_B}{shutter_A} \quad (6)$$

Figure 15:
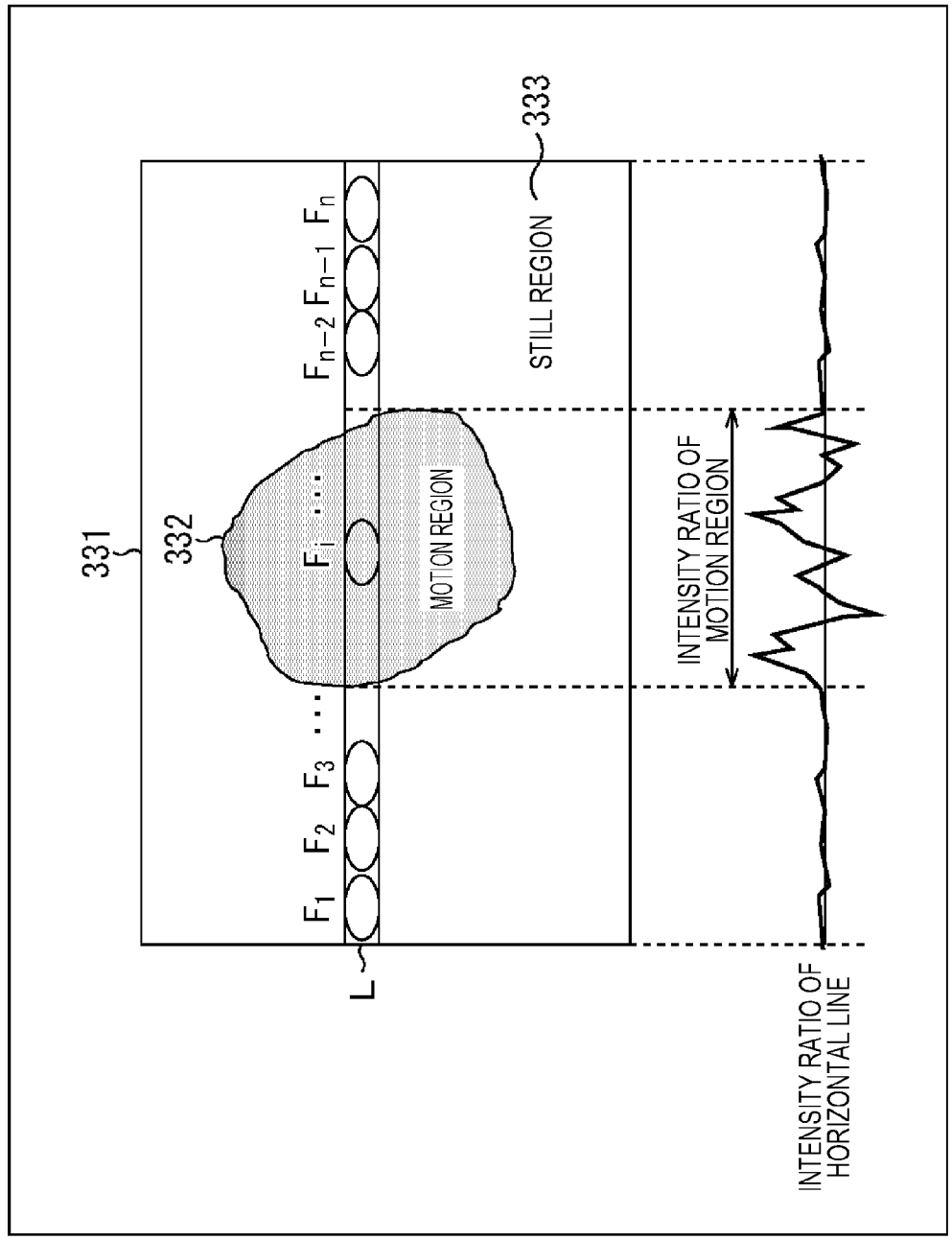
FIG. 15 is a diagram illustrated to describe elimination of flicker according to the first embodiment.

In Formula (6), Fi represents the intensity ratio of a pixel at a predetermined position in a line to be processed. As one example, an image as shown in FIG. 15 is considered to be a target to be processed. The upper portion of FIG. 15 shows a captured image 331 in which a motion region 332 and a still region 333 exist. The motion region 332 is a region in which a subject with motion is captured, for example, a region in which a person or the like is captured. The still region 333 is a region in which a subject without motion is captured, for example, a region in which a building or the like is captured.

Formula (6) is a formula that is applicable to both the case where the intensity ratio is calculated from a captured image in which pixels having different exposure conditions exist together and the case where the intensity ratio is calculated from a captured image when a plurality of images are captured by the changed exposure condition. Formula (8) described below is a specific formula in a case where the intensity ratio is calculated from a captured image in which pixels having different exposure conditions exist together.

When the intensity ratio is calculated from a captured image in which pixels having different exposure conditions exist together using Formula (6), in pixels at the same position, pixel values that are captured under different exposure conditions are aligned and then the intensity ratio is calculated using Formula (6). Thus, when the intensity ratio is calculated from a captured image in which pixels having different exposure conditions exist together using Formula (6), it is necessary to perform a preprocessing of aligning (e.g., alignment by interpolation) pixel values captured at different exposure conditions in pixels at the same position. The formula including such preprocessing is the Formula (8) described below.

On the other hand, in the case where the intensity ratio is calculated from a captured image when a plurality of images are captured by the changed exposure condition using Formula (6), the pixel values that are captured under different exposure conditions are aligned in pixels at the same position. Thus, Formula (6) is applied without performing the preprocessing, thereby calculating the intensity ratio.

In the predetermined line L of the image 331 shown in FIG. 15, the intensity ratios F1, F2, F3, . . . , Fi, . . . , Fn−2, Fn−1, and Fn are sequentially calculated.

$Vi^A$ represents the pixel value of exposure A, in this embodiment, long exposure, and $Vi^B$ represents the pixel value of exposure B, in this embodiment, short exposure. ShutterA represents the exposure time of the exposure A (long exposure), and ShutterB represents the exposure time of the exposure B (short exposure). Exposure Ratio is the exposure ratio between exposure A to exposure B.

In Formula (6), for the exposures A and B (long exposure and short exposure), the intensity ratio is calculated as a ratio obtained by multiplying the exposure A by the exposure ratio and normalizing the result in accordance with the exposure B.

In this case, if any of the exposures A and B is saturated on the condition that neither of the exposures A and B is saturated, the intensity ratio of the part fails to be calculated.

The motion contribution calculation unit 304 calculates an index indicating the degree of how much motion contributes to the intensity ratio of each point that is calculated by the intensity ratio calculation unit 303. As one example, if phases of flicker of two types of exposures in a still scene are coincident, the intensity ratio is 1. Otherwise, it shows that motion or flicker exists.

The motion contribution is an index used to judge whether the intensity ratio of each point is derived from motion or is derived from flicker. In other words, the intensity ratio having large motion contribution is derived from motion. The intensity ratio having small motion contribution is derived from flicker. As one example, if the motion contribution is greater than or equal to a predetermined value, it is derived from motion, and it is processed as the region in which motion exists in an image in the subsequent processes.

The flicker conversion coefficient calculation unit 305 calculates a flicker conversion coefficient used to convert a predetermined exposure flicker into a reference exposure flicker by using the intensity ratio of each point that is calculated by the intensity ratio calculation unit 303 and the motion contribution for the intensity ratio of each point that is calculated by the motion contribution calculation unit 304.

Specifically, by setting the intensity ratio that is not derived from motion that is calculated from the intensity ratio having small motion contribution to the flicker conversion coefficient, the conversion coefficient used to convert the flicker in the still region 333 into the flicker as reference exposure is calculated. The flicker as reference exposure is flicker captured at the time of long exposure, and the conversion coefficient used to convert the flicker captured at the time of short exposure into the flicker captured at the time of long exposure is calculated.

The motion detection unit 306 detects motion of each point using the flicker conversion coefficient calculated by the flicker conversion coefficient calculation unit 305 and the exposure value of each point. The each point has the finest granularity at each pixel position. A specific method of calculating motion will be described with reference to Formula (7).

[Math. 5]

$$M_{x,y} = |V_{x,y}^A \times \text{ExpRatio} - V_{x,y}^B \times F_{x,y}| \quad (7)$$

An absolute value of differences between a value normalized by multiplying exposure A ($Vx,y^A$) by the exposure ratio and a value obtained by multiplying exposure B ($Vx,y^B$) by the flicker conversion coefficient (Fx,y) is calculated, and the resultant calculated value is set to a detection value (Mx,y).

The flicker of the exposure B obtained by multiplying the exposure B by the flicker conversion coefficient is converted into the flicker of the exposure A. Then, by calculating a difference between the image of the exposure B converted into the exposure A and the image of the exposure A, the flicker component is eliminated, and thus it is possible to detect motion independent of the influence of flicker.

The magnitude of the motion detection values indicates a difference between the pixel value in the background region and the pixel value in the motion region.

The camera signal processing unit 302 performs a camera signal process such as demosaic process and HDR composition process using the RAW image data including a plurality of exposures selected by the line selection unit 301 and the motion information (line) detected by the motion detection unit 306. Then, the camera signal processing unit 302 outputs HDR information (line) in which all the colors are aligned.

The processes described above are performed repeatedly each time a line is selected by the line selection unit 301, and thus it is finally possible to simultaneously obtain the HDR image and motion information corresponding to it.

According to the present embodiment, as described above, it is possible to detect motion independent of the influence of flicker. The exposures A and B are different in exposure time from each other, and thus if a subject is moved during the time difference between the exposure times, the region of the subject is detected as there is motion. If the exposure time is different, the flicker is captured at different positions and in different magnitudes. Thus, in the case where only the difference between the exposures A and B is calculated, the flicker is detected as being included in the difference and is likely to be detected as motion. This will be described with reference to FIG. 16.

Figure 16:
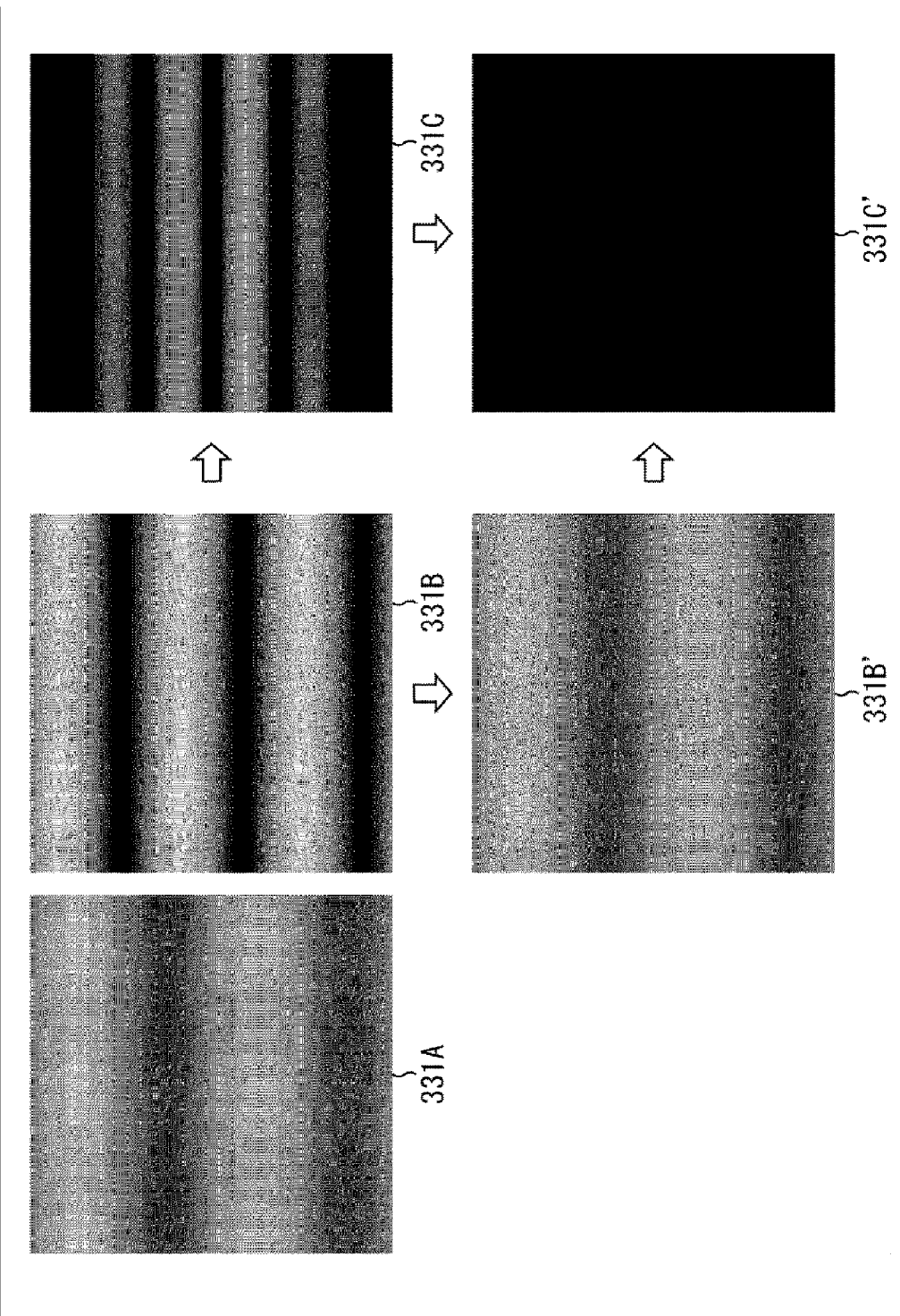
FIG. 16 is a diagram illustrated to describe motion detection with the reduced influence of flicker.

FIG. 16 represents an image obtained by capturing a whiteboard under a predetermined lighting. An image 331A is an image captured during the exposure A (long exposure), and an image 331B is an image captured during the exposure B (short exposure).

In the images 331A and 331B, the flicker component is captured, and thus the stripe pattern is formed. The proper target to be captured is not a stripe pattern but the whiteboard, and thus when the capturing is performed under the condition that the flicker occurs, the flicker will be captured as if it is a stripe pattern.

Although the principle of generation of flicker has been described with reference to FIGS. 1 and 2, when the alternating current is 50 Hz under the fluorescent lamp environment, the lighting is blinking 100 times per second. On the other hand, in the output of the image sensor 102 (FIG. 3) such as CMOS image sensor, the timing of exposure is different for each row, and thus the influence of the illumination light to be accumulated is also different for each row, which leads to appearance in the image as flicker of the stripe pattern.

As one example, when the frame rate of the image sensor 102 is 60 fps, the phases of the captured image flicker are aligned in every $\frac{1}{20}$ seconds, that is, the least common multiple of the illumination period ($\frac{1}{100}$ seconds) and the frame rate ($\frac{1}{60}$ seconds).

The stripe pattern of the flicker of the image 331A is thinner than the stripe pattern of the flicker of the image 331B as a result of comparison of the image 331A and the image 331B. The image 331A is greater in width of stripe than the image 331B. The image 331A is the image captured at the time of the long exposure, and it can be considered that the long exposure having less influence of flicker than the short exposure in terms of the depth of a color of the stripe pattern.

When two types of exposure information is used, as shown in the images 331A and 331B of FIG. 16, the flicker in the respective exposures exists. For the long exposure (exposure A), the integration range of the light source period is widened, and thus the amplitude of the flicker stripe tends to decrease. For the short exposure (exposure B), the integration range of the light source period is narrowed, and thus the amplitude of the flicker stripe tends to increase.

An image 331C is obtained by taking the difference between the image 331A and the image 331B. A plurality of stripes exist in the image 331C. In other words, if the difference between the image 331A and the image 331B is simply taken, the flicker component will be detected as difference.

In this case, the image 331A and the image 331B are different only in exposure time and are images obtained by capturing the same whiteboard. Thus, if there is no influence of the flicker, it makes no difference between the image 331A and the image 331B, and thus there is no stripe pattern or the like in an image obtained by taking the difference between the image 331A and the image 331B.

In this way, when the difference between the image 331A at the time of long exposure and the image 331B at the time of short exposure is simply calculated, a flicker component is detected and the motion region is likely to fail to be detected accurately. The motion region is a region where motion exists during the difference in exposure time between the long exposure and the short exposure. This motion region will be detected together with the flicker that is originally not a motion region.

The image shown as the image 331C in FIG. 16 is the image representing a result obtained by detecting motion generated by taking the difference between the image 331A at the time of long exposure and the image 331B at the time of short exposure. In the figure, the white portion is assumed to be detected as a portion where there is motion.

An image 331B' is the image obtained by converting the flicker of the image 331B into the flicker that is the same as the image 331A. The image 331B' is an image that is processed in the intensity ratio calculation unit 303, the motion contribution calculation unit 304, and the flicker conversion coefficient calculation unit 305, as described above, and then is generated by the conversion process in the motion detection unit 306.

In other words, the image 331B' is an image obtained by converting the flicker of the exposure B (short exposure) into the flicker of the exposure A (long exposure) using the flicker conversion coefficient calculated at each point, which is unaffected on the subject where there is motion. The image 331B' is an image in which the flicker captured at the time of long exposure is superimposed on the image captured at the time of short exposure.

An image 331C' is obtained by taking the difference between the image 331A and the image 331B'. In this case, the difference between the image 331A captured using the long exposure and the image 331B' captured using the short exposure in which the flicker captured using the long exposure exists is calculated.

Thus, the flicker of the image 331A and the flicker of the image 331B' are the same component, and thus, when the difference is calculated, the flicker component as the difference is not detected. Thus, in this case, as shown as the image 331C', unlike the image 331C, it becomes an image in which there is no white region, that is, an image from which a region where there is motion is not detected.

In this case, the whiteboard is captured, and thus there is no moving object and, no detection of any moving object is the correct detection. In this way, the flicker in the image captured at the time of short exposure is converted into the flicker in the image captured at the time of long exposure and then the difference between them is calculated, thereby performing the motion detection that is unaffected by the flicker.

In this way, the use of conversion of the flicker in the image captured at the time of short exposure into the flicker in the image captured at the time of long exposure makes it possible to perform flicker correction.

The setting of the exposure time of the long exposure to the exposure time that is unaffected by the flicker allows the image that is captured at the time of long exposure to be flicker free. As one example, the setting of the exposure time of the long exposure to the exposure length that is a multiple of the illumination period makes it possible to obtain a flicker free image. According to the present technology, the flicker in the image captured at the time of short exposure can be converted into the flicker in the image captured at the time of long exposure. Thus, if the image captured at the time of long exposure is flicker free, it is may also be possible to make the image captured at the time of short exposure flicker free.

In this way, the flicker free image obtained at the time of long exposure and the flicker free image obtained at the time of short exposure can be composed, thereby generating the HDR image (high dynamic range image).

<Image Processing According to First Embodiment>

Figure 17:
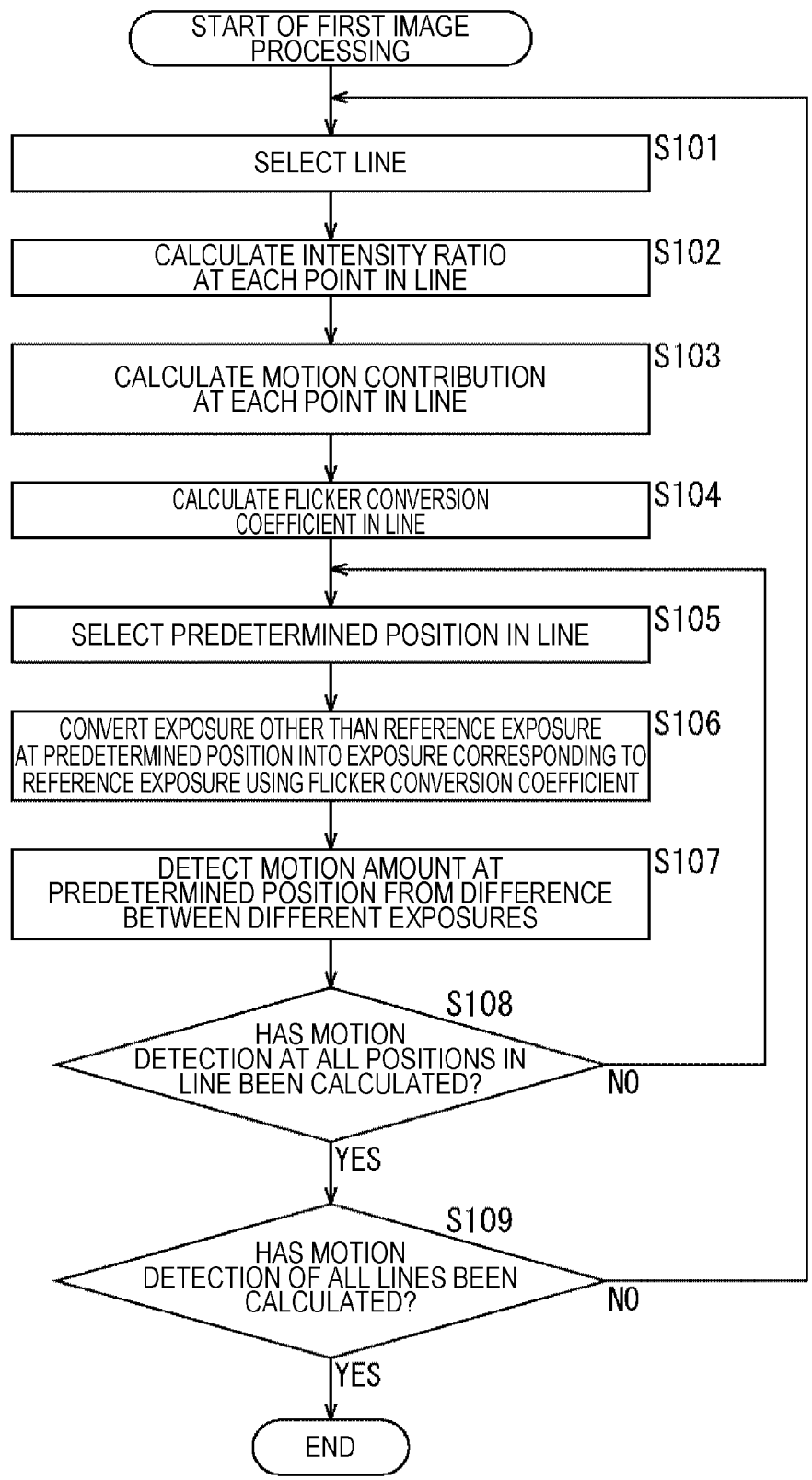
FIG. 17 is a flowchart illustrated to describe an operation performed by the image processing unit according to the first embodiment.

Such motion detection will be further described. FIG. 17 is a flowchart shown to describe the process performed by the image processing unit 103 shown in FIG. 14.

In step S101, the line selection unit 301 selects a line to be processed. In step S102, the intensity ratio at each point in the line is calculated.

As described above, an image inputted to the line selection unit 301 is two images that are captured by the long exposure and the short exposure or one image in which the capturing using the long exposure and the capturing using the short exposure are performed together.

When one image is inputted, the process by the intensity ratio calculation unit 303 may be performed after the images captured with the long exposure and the image captured with the short exposure are each generated from the inputted image. As described with reference to FIG. 18, the use of a predetermined timing may allow the intensity ratio calculation unit 303 to be performed by performing interpolation.

Figure 18:
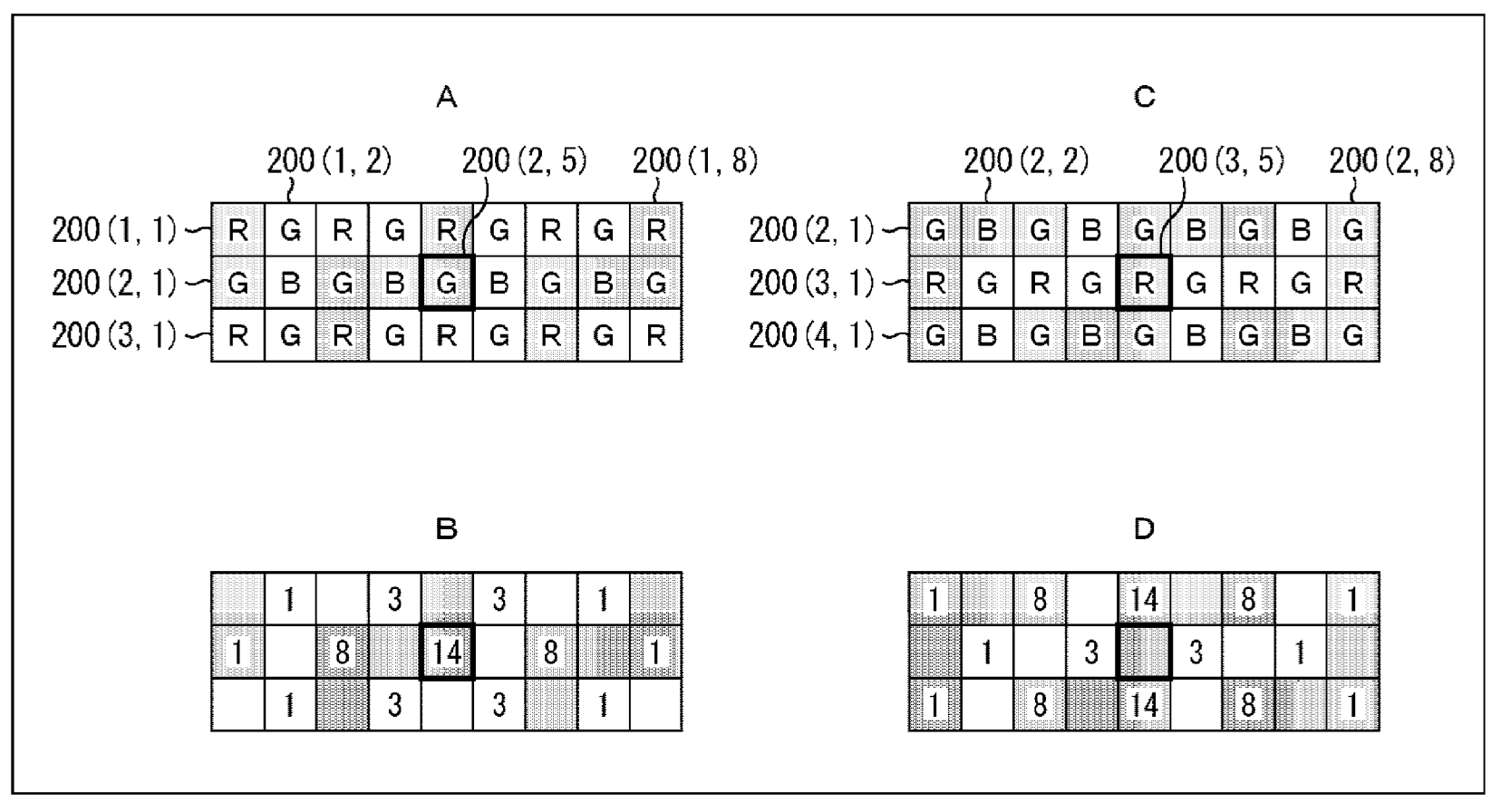

A method of calculating the intensity ratio at each point in an image captured by the image sensor 102 having the pixel arrangement shown in FIG. 4 will be described. The portion A of FIG. 18 shows the arrangement obtained by extracting the first to third rows from the pixel arrangement shown in FIG. 4. The portion C of FIG. 18 shows the arrangement obtained by extracting the second to fourth rows from the pixel arrangement shown in FIG. 4.

When the capturing is performed in the image sensor 102 having the pixel arrangement in which pixels captured at a plurality of exposure times as shown in the portion A or B of FIG. 18 exist together, the exposure is performed individually for each pixel. Thus, it is necessary to align two exposures in the same pixel position to calculate the intensity ratio in the same pixel position.

The following Formula (8) is the formula for calculating the intensity ratio. Formula (8) is the formula used to calculate the intensity ratio from the captured image in which pixels captured at different exposure conditions exist together as described in Formula (6), and the preprocessing of aligning exposure conditions at the same position is included in Formula (8).

The relationship between Formulas (6) and (8) is given on the left side as shown in the following equation.

In Formula (6), $Vi^A \times ExpRatio = LPF(G_A^i)$ of Formula (8)

In Formula (6), $Vi^B = LPF(G_B^i)$ of Formula (8)

[Math. 6]

$$F = \frac{LPF(G_B^i)}{LPF(G_A^i)} = \frac{\sum w_i \times G_B^i}{\sum w_j \times G_A^j \times ExpRatio} \quad (8)$$

In Formula (8), i represents the location of the exposure B (short exposure) of the color G, and j represents the position of the exposure A (long exposure) of the color G. In other words, in the portion A of FIG. 18, the intensity ratio of the position of a pixel surrounded by the thick frame is calculated as the ratio of a low pass filter (LPF) by multiplying the G pixel of the exposure A by an exposure ratio to the LPF of the G pixel of the exposure B. The portions A to D in FIG. 18 indicate the peripheral region of a target pixel marked by the thick frame. The upper portions A and C in FIG. 18 represent the color and exposure pattern, and the lower portions B and D in FIG. 18 represent the weights $w_i$ and $W_j$ of Formula (8).

The portions A and B in FIG. 18 represent the pattern in the case where the center pixel is the pixel G, and the portion C and D in FIG. 18 represent the pattern in the case where the center pixel is a pixel other than the pixel G (pixel R or B). The color of the pixel G is employed because the number of samples of the pixel G is large and the sensitivity (S/N) of the pixel G is better than the pixel R or B. It is also possible to calculate the intensity ratio by the LPF using all the pixels R, G, and B in addition to the LPF only using the pixel G.

Referring back to the flowchart shown in FIG. 17, in step S102, the intensity ratio calculation unit 303 calculates a ratio between a pixel value at the time of long exposure and a pixel ratio at the time of short exposure based on Formulas (6) and (8). As described above with reference to FIG. 15, the intensity ratio calculation unit 303 calculates an intensity ratio Fi for each point in the horizontal direction of the line based on Formulas (6) and (8).

An example of the calculated intensity ratio is shown in FIG. 15. Referring again to FIG. 15, in the graph shown on the lower side of FIG. 15, the vertical direction represents the intensity ratio, and the horizontal direction represents the pixel position in the line corresponding to the upper portion of FIG. 15. As the graph shown in the lower portion of FIG. 15, when the intensity ratio in the motion region 332 is compared with the intensity ratio in the still region 333, the intensity ratio in the motion region 332 is greater than the intensity ratio in the still region 333, and accordingly, its variation tends to increase.

In the example shown in FIG. 15, the variation in the intensity ratios in the still region 333 is small. However, this variation is mainly caused by noise, and thus if there is no noise, values are made constant. In other words, in the still region 333, the ratio between a pixel value at the time of long exposure and a pixel value at the time of short exposure at the same position is made constant. In the still region 333, even allowing for noise, the intensity ratio is kept within a predetermined range.

In the motion region 332, the ratio between a pixel value at the time of long exposure and a pixel value at the time of short exposure at the same position is not constant but subject to fluctuation as shown in FIG. 15.

For this reason, if all in the line are still regions 333, the intensity ratio is constant, but if the motion region 332 exists in the line, the intensity ratio is not constant in that region. The use of such properties allows the motion contribution and a flicker conversion coefficient of the intensity ratio at each point to be calculated.

Referring back to the flowchart of FIG. 17, in step S103, the motion contribution calculation unit 304 calculates the motion contribution. The motion contribution is calculated as an index indicating the degree of how much motion contributes to the intensity ratio at each point calculated by the intensity ratio calculation unit 303, as described above. As one example, if the phases of the flicker in the two types of exposures in a still scene match, the intensity ratio is 1. Otherwise, there is motion or flicker.

The motion contribution is an index used to judge whether the intensity ratio of each point is derived from motion or is derived from flicker. In other words, the intensity ratio having large motion contribution is derived from motion, and the intensity ratio having small motion contribution is derived from flicker.

In step S104, the flicker conversion coefficient calculation unit 305 calculates a flicker conversion coefficient. The calculation of the flicker conversion coefficient will be described with reference to FIG. 19. In the graph shown in FIG. 19, the vertical axis represents the intensity ratio, and the horizontal axis represents the position of a pixel in the horizontal direction.

Figure 19:
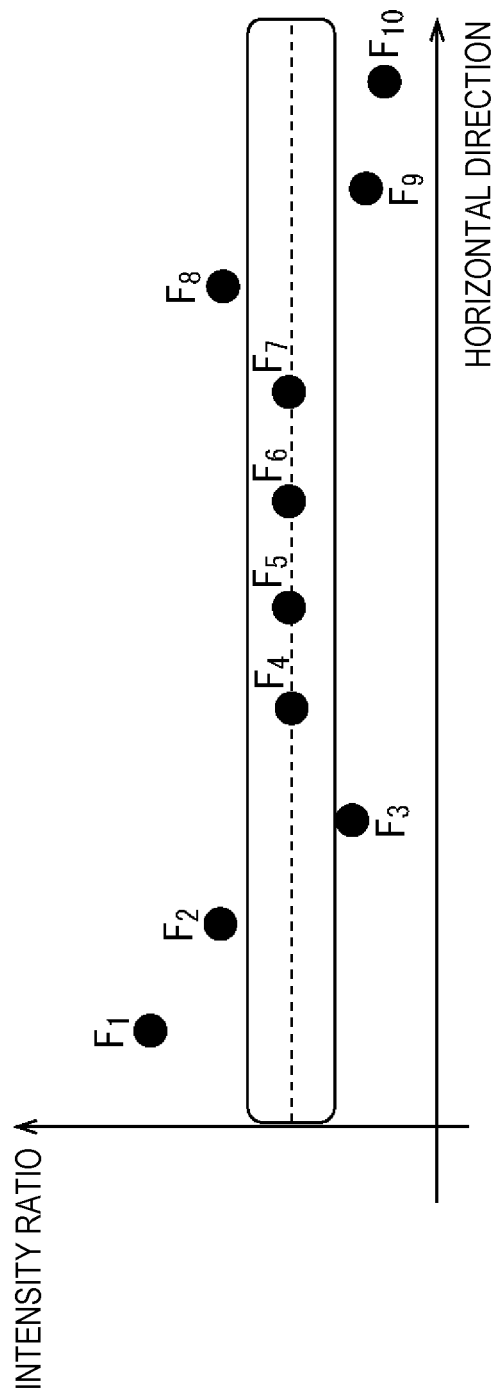
FIG. 19 is a diagram illustrated to describe distribution of intensity ratios.

FIG. 19 illustrates an example in which ten intensity ratios of F1 to F10 are calculated from a single line. Note that, although the description is given by taking ten intensity ratios as an example, it is preferable to calculate the intensity ratio of the same number as that of the pixels that constitute one line.

It is also possible to use a configuration for determining the intensity ratio using the number of pixels that is smaller than that of pixels that exist in one line to achieve reduction in processing time and throughput. As one example, it is also possible to use a configuration for calculating the intensity ratio for every position skipping a predetermined number of pixels.

As given in the description of the intensity ratio calculation unit 303, the intensity ratio of the motion region 332 and the intensity ratio of the still region 333 exist together. When the motion region 332 is smaller than the image width to some extent as shown in FIG. 15, the intensity ratio of the still region 333 can be assumed to be dominant, and thus it is possible to calculate the flicker conversion coefficient equal to the intensity ratio of the still region using statistical processing.

The procedure of the statistical processing is described. As shown in FIG. 18, if the intensity ratios F1 to F10 are calculated, these intensity ratios F1 to F10 are sequentially selected, and the evaluation value for each intensity ratio is calculated using the evaluation expression given by Formula (9) below. The intensity ratio Fi having the highest evaluation value is set to the flicker conversion coefficient equal to the intensity ratio of the still region.

[Math. 7]

$$E_i = \sum_{j=1}^{n} S(F_i, F_j) \quad (9)$$

According to Formula (9), the intensity ratio within a predetermined range around each point is used for each point, and thus the flicker conversion coefficient is calculated. An example of variations of Formula (9) includes Formulas (10), (11), and (12), shown below.

[Math. 8]

$$S(a, b) = \begin{cases} 1 & \text{if } |a-b| < th \\ 0 & \text{else} \end{cases} \quad (10)$$

According to Formula (10), as one example, if the intensity ratio of adjacent pixels is within a predetermined threshold, it is set to 1; otherwise, it is set to 0. In Formula (10), a is set to Fi and b is set to Fj. In the case where intensity ratios Fi and Fj are obtained from adjacent pixels, if an absolute value of differences between the intensity ratios Fi and Fj is less than or equal to a threshold th, that is, if the variation can be judged to be caused only by noise because the intensity ratio is obtained in the still region 333, the evaluation value of the intensity ratio is set to 1.

On the other hand, when the intensity ratio is obtained in the motion region 332, an absolute value of differences between the intensity ratios is not kept within the predetermined threshold th. Thus, in such case, a value of 0 is set. By performing such calculation, most frequently appearing intensity ratio is derived in one line, and this intensity ratio is set as the flicker conversion coefficient.

[Math. 9]

$$S(a, b) = \begin{cases} th - |a-b| & \text{if } |a-b| < th \\ 0 & \text{else} \end{cases} \quad (11)$$

Even in Formula (11), like Formula (10), as one example, the determination of whether the absolute value of differences between the intensity ratios from adjacent pixels in a line is kept within the predetermined threshold th allows the results to be classified. If the absolute value of differences between the intensity ratios is kept within the predetermined threshold th, a value obtained by subtracting the absolute value of differences between the intensity ratios from the threshold th is set as the evaluation value of the intensity ratio.

On the other hand, if the absolute value of differences between the intensity ratios is not within the predetermined threshold th, a value of 0 is set as the evaluation value. By performing such calculation, a median value of the intensity ratio in one line is derived, and thus the intensity ratio of the value is set as the flicker conversion coefficient.

[Math. 10]

$$S(a, b) = \exp\left\{-\frac{(a-b)^2}{2 \times th^2}\right\} \quad (12)$$

In Formula (12), as one example, the square of the difference between the intensity ratios from adjacent pixels in a line is divided by a value obtained by multiplying the square of the predetermined threshold th by 2, and then, an exponential function of the result is calculated.

The motion contribution for each intensity ratio can be expressed by the degree of divergence between each intensity ratio and the calculated intensity ratio of the still region 333. In other words, as the divergence increases, accordingly the motion contribution increases. If the motion contribution is large, it is more likely to be a motion region, and thus the intensity ratio from such a region is unsuitable for the flicker conversion coefficient.

Thus, the calculation based on Formula (12) is performed so that the intensity ratio that is more likely to be an intensity ratio from a motion region has low weight for the evaluation value and the intensity ratio that is more likely to be an intensity ratio from a region (still region) other than a motion region has high weight for the evaluation value.

The calculation based on Formula (12) makes it possible to determine the weighted average value from a plurality of intensity ratios in which the weight for the value having high motion contribution is set to be reduced and the weight for the value having low motion contribution is set to be increased. Then, this weighted average value can be set as the flicker conversion coefficient.

The flicker conversion coefficient is determined by using any of such determination. The flicker conversion coefficient may be determined by using other calculation methods. The calculation may be performed by substituting only the intensity ratio, which can be judged as the intensity ratio that has low motion contribution and is derived from the flicker by using the motion contribution, into any formulas described above.

The description continues with reference to the flowchart of FIG. 17. In step S105, the motion detection unit 306 selects a predetermined position in a line as a target to be processed. In step S106, the exposure other than the reference exposure at a predetermined position is converted into an exposure corresponding to the reference exposure using the flicker conversion coefficient. This process corresponds to a process for converting the image 331B described with reference to FIG. 16 into the image 331B'.

In step S107, the motion amount at a predetermined position is detected from the difference between different exposures. This process corresponds to a process for calculating the difference between the image 331A described with reference to FIG. 16 and the image 331B'. In step S108, it is judged whether the motion detection has been calculated at all positions in the line. If it is judged in step S108 that there is an unprocessed pixel in the line, the process returns to step S105 and the subsequent process is repeated.

On the other hand, if it is judged in step S108 that all the pixels in the line have been processed, the process proceeds to step S109. In step S109, it is judged whether the motion detection has been calculated from all the lines in the image to be processed.

If it is judged in step S109 that there is an unprocessed line in the image as a target to be processed, the process returns to step S101, and then step S101 and the subsequent process are repeated for the unprocessed line.

On the other hand, if it is judged in step S109 that all the lines in the image as a target to be processed have been processed, the process for detecting motion in the image is completed.

In this way, according to the first embodiment, it is possible to perform the motion detection that is unaffected by the flicker. Thus, the accuracy of the motion detection can be improved.

In this way, according to the present technology, the flicker conversion coefficient in the line is one, and thus the process is performed independently in each line. Thus, it is possible to cope with the illumination variation in the vertical direction of the flicker light source. This will be described further as the third embodiment.

<Configuration of Image Processing Unit According to Second Embodiment>

A description will be given of a second embodiment. The first embodiment described above is effective when the motion region 332 and the still region 333 exist in one line. However, when all the pixels on a predetermined line exist in the motion region 332 or when they are saturated, the intensity ratio of pixel values of different exposures fails to be calculated, and the flicker conversion is not likely to be performed.

The second embodiment is a mode in which the flicker conversion is carried out even when all the pixels on a predetermined line exist in the motion region 332 or when they are saturated.

Figure 20:
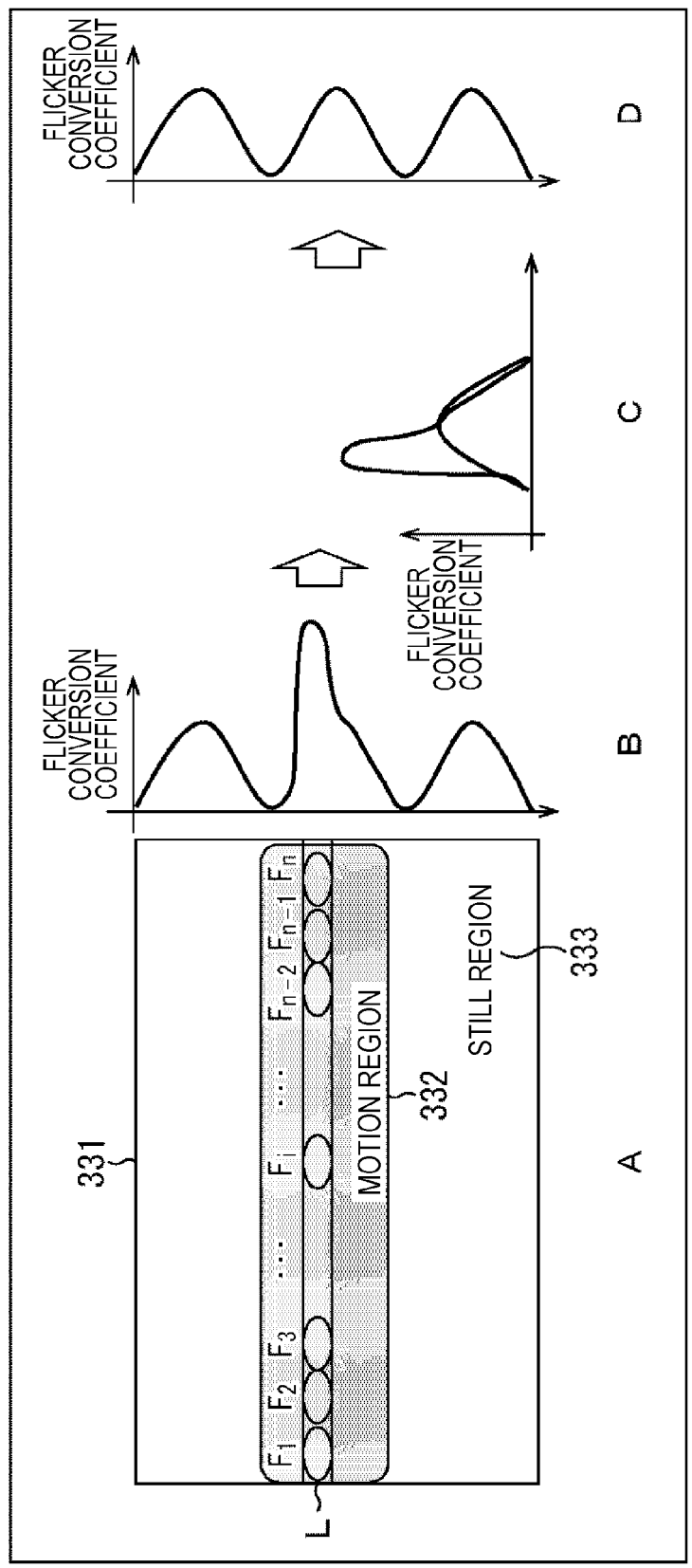
FIG. 20 is a diagram illustrated to describe elimination of flicker according to a second embodiment.

The flicker conversion in the second embodiment will be described with reference to FIG. 20. The portion A of FIG. 20 shows a scene in which a motion region with image width exists in a target line. In other words, all pixels on a predetermined line L in the image 331 exist in the motion region 332. The still region 333 exists above and below the motion region 332 including the line L.

When the flicker conversion coefficient is calculated from such image 331, it becomes as shown in the portion B of FIG. 20. The flicker conversion coefficient obtained from the still region 33 has a waveform in which its maximum value is in the region where the flicker probably exists. In the region in which all the pixels on the line are in the motion region 332, an error occurs in the flicker conversion coefficient (motion component exists), and thus the graph of the flicker conversion coefficient is not a smooth waveform.

This is because no intensity ratio of the still region is obtained if all the regions in the line are motion regions even by performing the process as described in the first embodiment.

There is a periodicity in the flicker. Thus, even when all the regions in the line are motion regions and no intensity ratio of the still region is obtained, the use of periodicity in the vertical direction of the flicker conversion coefficient makes it possible to update the flicker conversion coefficient and to determine accurately the intensity ratio of the still region equal to the flicker conversion coefficient of the line in which the motion region with image width exists.

In other words, as shown in the portion C of FIG. 20, the period of the flicker conversion coefficient obtained from within the still region 333 is identical to the period of the flicker conversion coefficient obtained from within the region where all the regions in the line exist in the motion region 332. Thus, as shown in the portion D of FIG. 20, by using the period of the flicker conversion coefficient obtained from within the still region 333 as the period of the flicker conversion coefficient obtained from within the region where all the regions in the line exist in the motion region 332, the flicker conversion coefficient in which all the regions in the line exist in the motion region 332 is calculated accurately.

Figure 21:
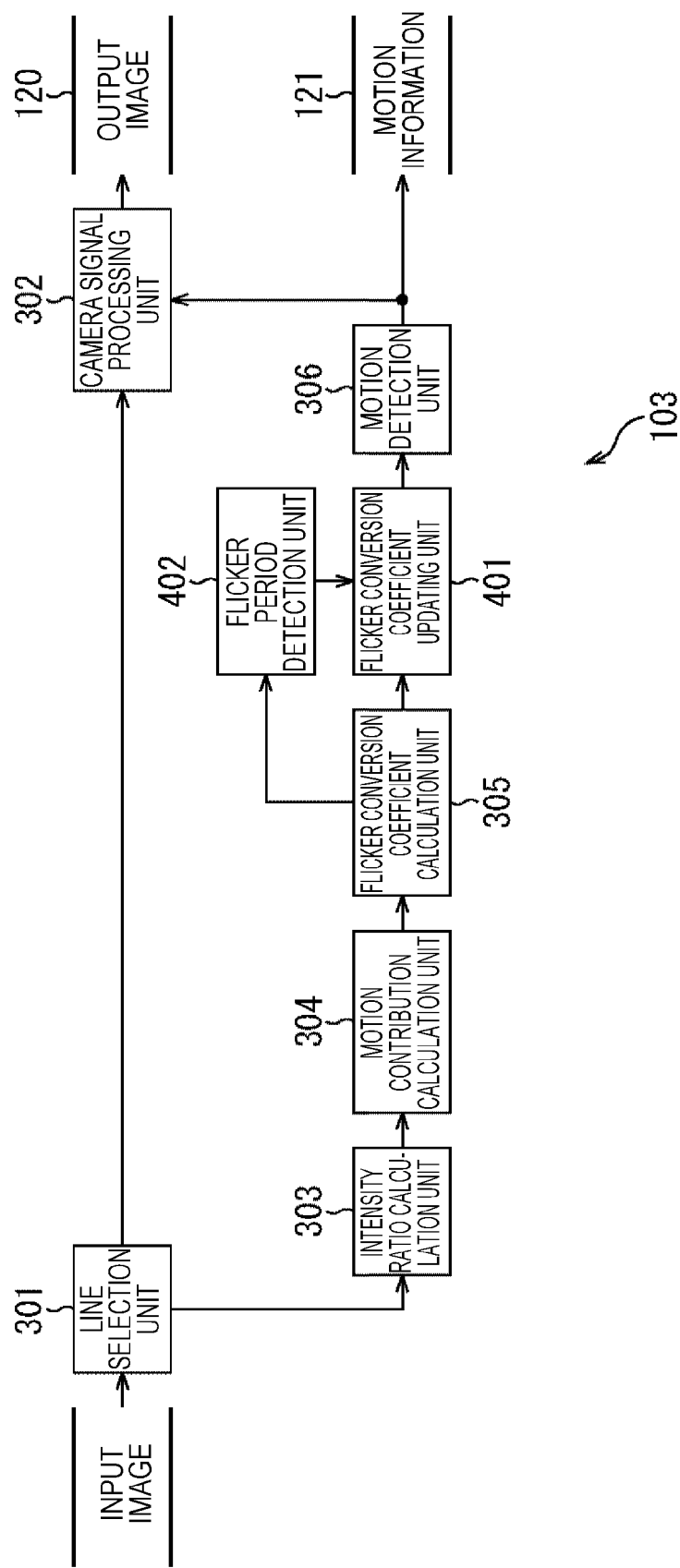
FIG. 21 is a diagram illustrated to describe a configuration of an image processing unit according to the second embodiment.

The configuration of an image processing unit 103 that is configured to update the flicker conversion coefficient is illustrated in FIG. 21. The components, which are similar to those of the image processing unit 103 (FIG. 14) according to the first embodiment, are denoted by the same numerals, and will not be described in detail.

The image processing unit 103 shown in FIG. 21 is configured to include a line selection unit 301, a camera signal processing unit 302, an intensity ratio calculation unit 303, a motion contribution calculation unit 304, a flicker conversion coefficient calculation unit 305, and a motion detection unit 306. This configuration arrangement is the same as the image processing unit 103 according to the first embodiment. The image processing unit 103 according to the second embodiment is configured to further include a flicker conversion coefficient updating unit 401 and a flicker period detection unit 402.

The image processing unit 103 is configured to allow the flicker conversion coefficient updating unit 401 to update the flicker conversion coefficient for each line calculated by the flicker conversion coefficient calculation unit 305 using the period of flicker detected by the flicker period detection unit 402.

The flicker period detection unit 402 calculates the period of flicker equal to the period of the flicker conversion coefficient from the flicker conversion coefficient for each line calculated by the flicker conversion coefficient calculation unit 305. As described with reference to FIG. 20, the flicker occurs periodically, and thus the flicker conversion coefficient has a predetermined period. Thus, the graph as shown in the portion B of FIG. 20 can be obtained by observing the change in the flicker conversion coefficients.

As one example, in the example shown in the portion B of FIG. 20, the flicker conversion coefficient for one period is obtained from the still region 333 on the top of the image 331. After the flicker conversion coefficient for one period is obtained, the period is kept as in the central part of the portion B in FIG. 20. However, when there is a part in which values of the flicker conversion coefficient are varied, the flicker conversion coefficient is corrected by applying the obtained flicker conversion coefficient for one period to the part. This correction is performed by the flicker conversion coefficient updating unit 401.

The flicker conversion coefficient updating unit 401 determines a line that is the same in phase as a target line using the period of flicker calculated by the flicker period detection unit 402 and updates the flicker conversion coefficient of the target line using the flicker conversion coefficient.

<Image Processing According to Second Embodiment>

The process performed by the image processing unit 103 shown in FIG. 21 will be described with reference to the flowchart of FIG. 22.

The processes in steps S151 to S154 are the processes performed by the line selection unit 301, the intensity ratio calculation unit 303, the motion contribution calculation unit 304, and the flicker conversion coefficient calculation unit 305. The processes in steps S151 to S154 are similar to those of steps S101 to S104 in the flowchart of FIG. 17, and thus and will not be described in detail herein.

In step S155, the flicker period detection unit 402 determines the period of flicker. As one example, the flicker period detection unit 402 holds the flicker conversion coefficient calculated by the flicker conversion coefficient calculation unit 305, creates the graph as shown in the portion B of FIG. 20, and determines the period.

If it is judged in step S156 that the period is determined as a result of judging whether the period is determined, the process returns to step S151 and the subsequent process is repeated. As one example, referring back to the graph of the portion B in FIG. 20, if it is judged that the period is determined as one by the flicker conversion coefficient calculated from the upper still region 333 within the image 331, it is judged in step S156 that the period is determined.

If it is judged in step S156 that the period is determined, the process proceeds to step S157. In step S157, the flicker conversion coefficient updating unit 401 updates the flicker conversion coefficient using the flicker conversion coefficient of an in-phase line.

The processing of all the lines within the image, calculation of the flicker conversion coefficient, and creation of the graph as shown in the portion B of FIG. 20 may be performed before proceeding to step S157. In such a case, when the graph shown in the portion B of FIG. 20 is obtained, it is also possible to achieve the configuration in which a portion where the flicker conversion coefficient varies is updated and a portion where the flicker conversion coefficient does not vary is not updated.

When the graph as shown in the portion D of FIG. 20 is obtained, it is unnecessary to update the flicker conversion coefficient, and thus the process may proceed to step S158 while skipping the process of step S157. In this case, its basic operation is identical to that of the first embodiment. In other words, the first embodiment is based on the assumption that the graph as shown in the portion D of FIG. 20 is obtained, and thus it is possible to skip the process for updating the flicker conversion coefficient.

Thus, it also is possible to follow the procedure of the process for combining the first and second embodiments, judging whether the graph as shown in the portion D of FIG. 20 is obtained, in other words, whether there is a region in which the flicker conversion coefficient is subject to great fluctuation. In this case, if it is judged that there is such a region, the process for updating the flicker conversion coefficient is performed; otherwise, if it is not judged that there is such a region, the process for updating the flicker conversion coefficient is not performed.

Figure 22:
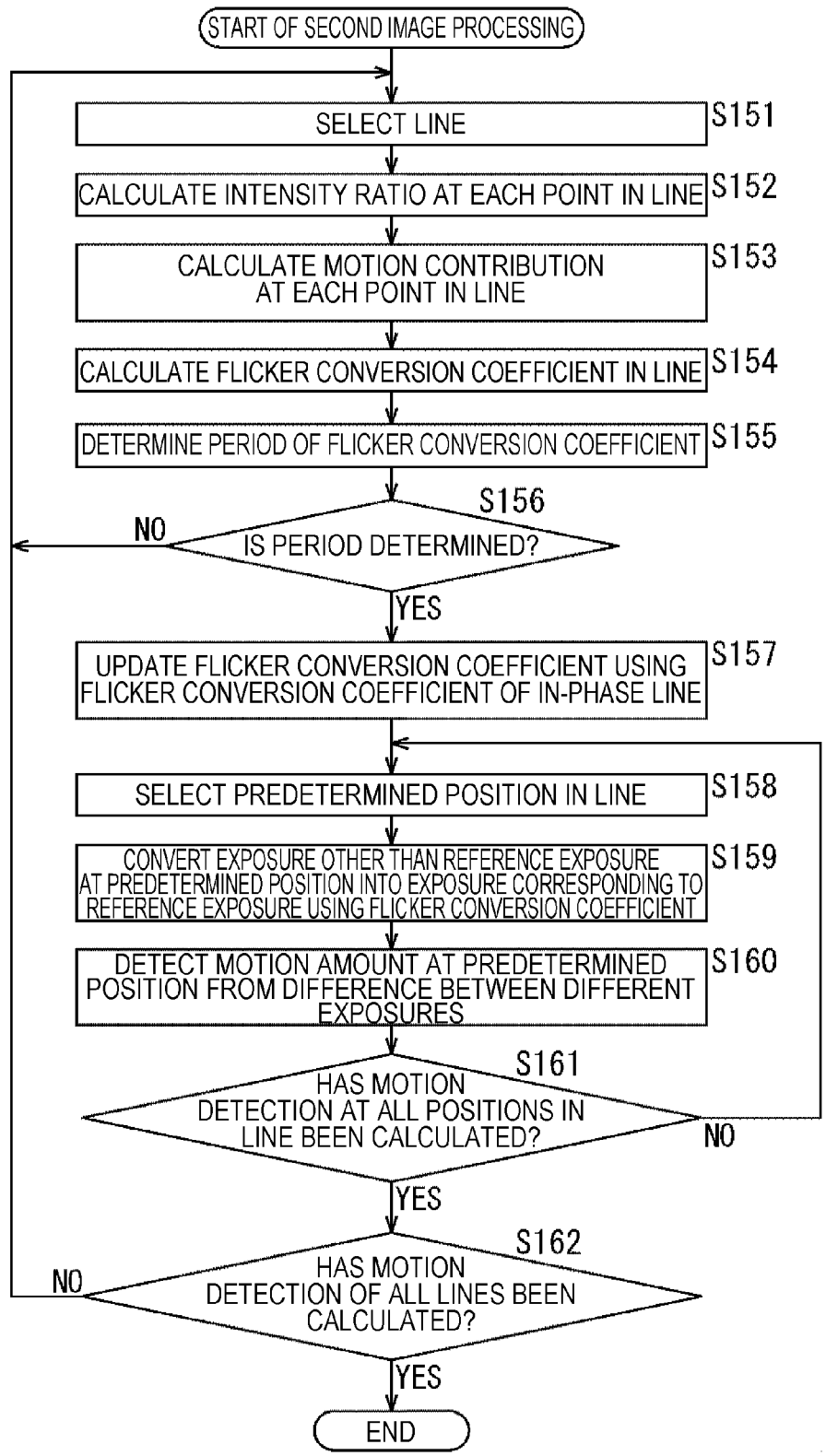
FIG. 22 is a flowchart illustrated to describe an operation performed by the image processing unit according to the second embodiment.

Referring back to the flowchart of FIG. 22, in step S157, if the flicker conversion coefficient is updated, the updated flicker conversion coefficient is outputted to the motion detection unit 306 of the subsequent stage. The processes in steps S158 to S162 performed by the motion detection unit 306 are similar to those performed by the motion detection unit 306 (FIG. 14) according to the first embodiment, and thus are similarly performed as the step S105 to S109 of FIG. 17, and will not be described in detail.

If it is not judged in step S162 that the motion detection of all lines has been calculated, the process returns to step S151 and the subsequent processes are repeated. In this case, the period of the flicker conversion coefficient is previously determined, and thus it is possible to skip the process of steps S155 and S156 (there is no process performed by the flicker period detection unit 402).

When all the flicker conversion coefficients in one image are determined and then the process of step S157 and the subsequent process are performed, if it is not judged in step S162 that the motion detection of all the lines has been calculated, the process may return to the process of step S158, and the subsequent processes may be repeated.

In this way, according to the second embodiment, it is possible to perform the motion detection that is unaffected by the flicker even in the image 331 including a line in which all the horizontal lines is included in the motion region 332. Thus, it is possible to improve the accuracy of motion detection.

<Image Processing According to Third Embodiment>

In the first embodiment, the flicker conversion coefficient in a line is one and the process is performed independently for each line, and thus it is possible to cope with illumination variation in the vertical direction of the flicker light source. This means that the present technology is applicable even under the situation as shown in FIG. 23, as one example.

Figure 23:
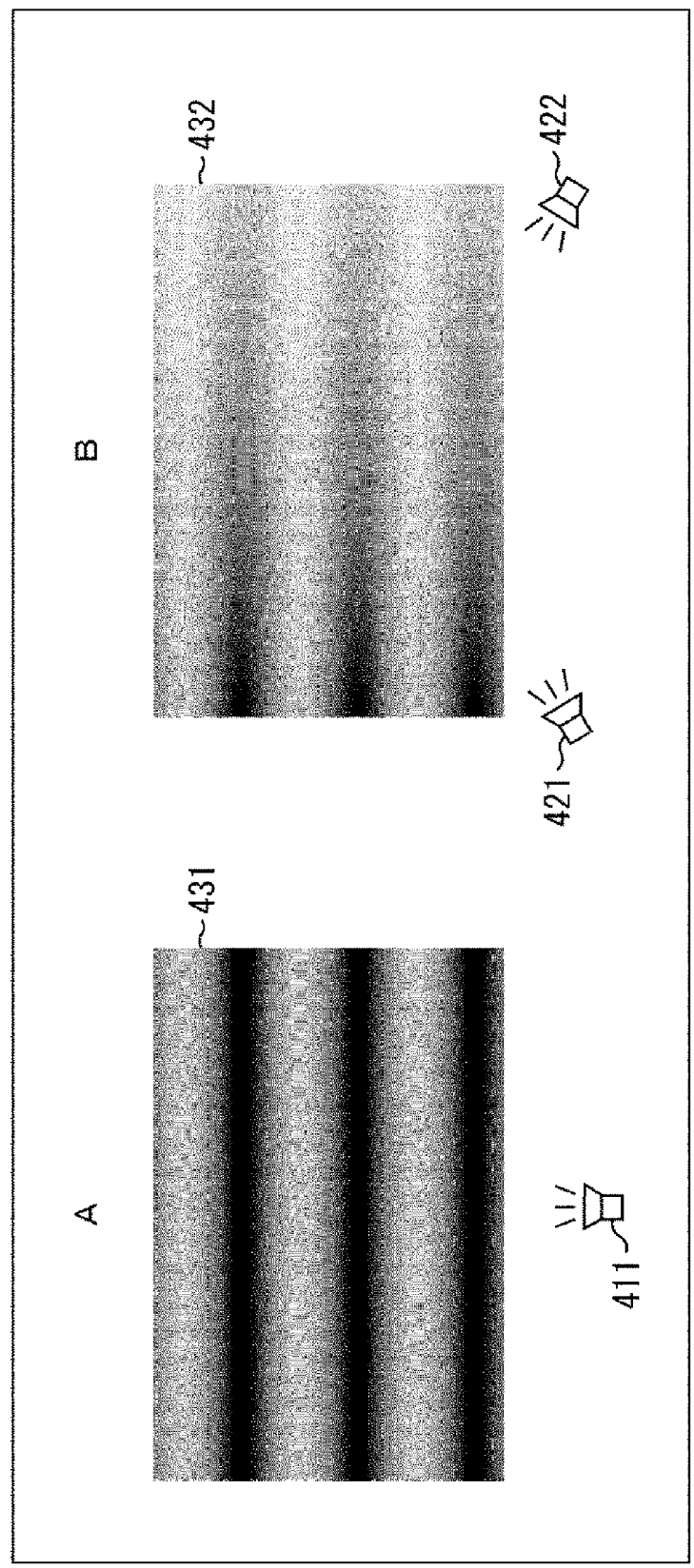
FIG. 23 is a diagram illustrated to describe the influence by a flicker light source according to a third embodiment.

The portion A of FIG. 23 shows an image 431 captured under the situation in which there is a flicker light source 411. The portion A of FIG. 23 shows a case in which the influence of the flicker light source is constant. The image 431 is the same as the image 331A or the like shown in FIG. 16 and is an image on which the stripe pattern is projected by the influence of the flicker light source 411 as one example. In this way, when the number of the flicker light source 411 is one and the influence of the flicker light source is constant, a uniform stripe pattern appears in the image 431.

The portion B of FIG. 23 shows an image 432 captured under the situation in which there is a flicker light source 421 and a flicker light source 422. The portion B of FIG. 23 shows a case in which the influence of the flicker light source varies spatially. As shown in the portion B of FIG. 23, when a subject, for example, a whiteboard is captured such that it is struck by light from both the flicker light sources 421 and 422, the left side of the whiteboard in the figure is more greatly affected by the flicker light source 421 and the right side is more greatly affected by the flicker light source 422.

In other words, the influence by the flicker light source 421 on the left side in the image 432 is strong; meanwhile the influence by the flicker light source 421 on the right side is weak. That is, the influence of the flicker light source 421 is not constant but varies spatially. In such a case, as shown in the portion B of FIG. 23 as the image 432, a non-uniform stripe pattern appears in the image 432 rather than a uniform stripe pattern, as an example, a dark stripe pattern appears on the left side in the figure and a light stripe pattern appears on the right side.

When such influence of the flicker light source varies spatially, the assumption that the intensity ratio of the still region in a line is constant is not established as in the first embodiment. A description will be given of a third embodiment capable of handling even when such influence of the flicker light source varies spatially.

Figure 24:
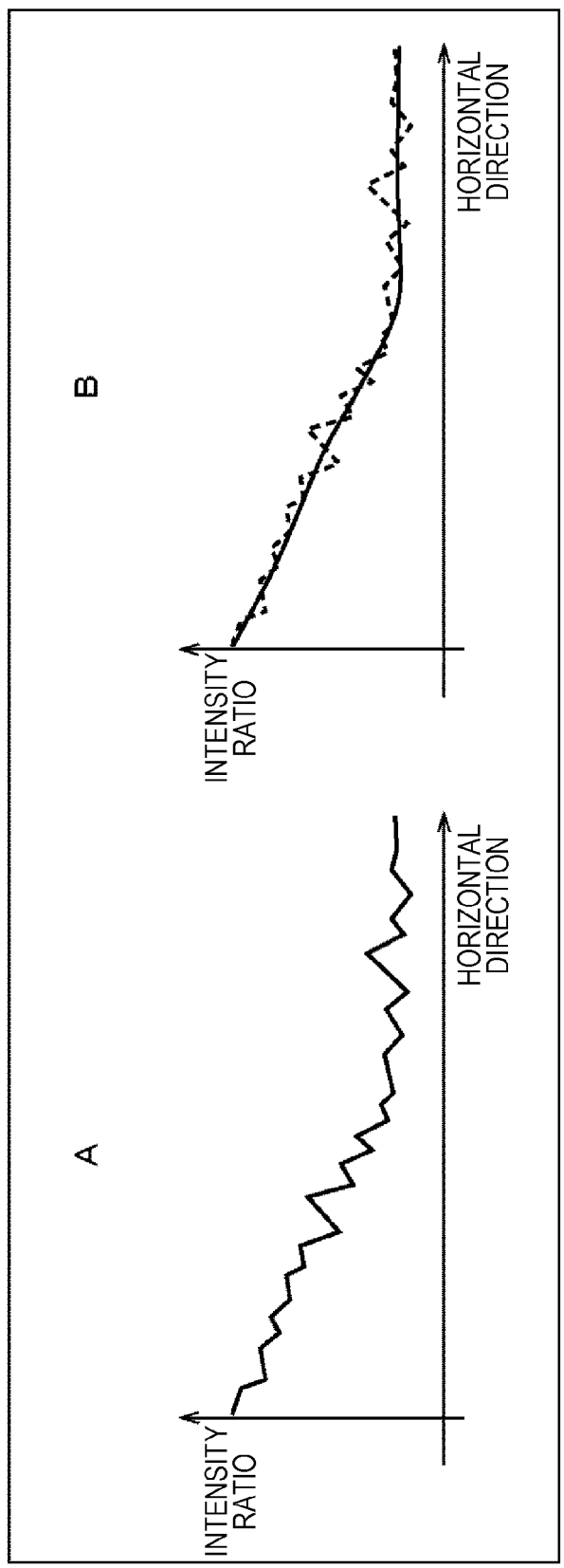
FIG. 24 is a diagram illustrated to describe correction of an intensity ratio.

Even in the third embodiment, the intensity ratio in a line is calculated. The portion A of FIG. 24 is, like the image 432 shown in the portion B of FIG. 24, a graph indicating the intensity ratio at each point in a predetermined line obtained from the image captured when the influence of the flicker light source varies spatially. The horizontal axis represents the pixel position in the horizontal direction, and the vertical axis represents the intensity ratio.

As shown in the portion A of FIG. 24, when the influence of the flicker light source varies spatially, the intensity ratio of the motion region 332 and the intensity ratio of the still region 333 exist together, and the intensity ratio of the still image 333 is changed with the variation of the flicker light source in the horizontal direction.

Thus, the flicker conversion coefficient equal to the intensity ratio of the still region at each point as shown in the portion B of FIG. 23 is calculated from the intensity ratio shown in the portion A of FIG. 23. Although the description has been given of the case where the intensity ratio of the still region in a line is constant in the first embodiment, the intensity ratio of the still region can be calculated for each point in the third embodiment.

Specifically, the calculation is performed based on the assumption that the local large variation results from motion but the global variation results from variation in light source. As one example, the calculation of the intensity ratio of the still region at each point is performed based on Formula (13) below.

[Math. 11]

$$F'_i = \frac{\sum_{j=1}^{n} w_j \times F_j}{\sum_{j=1}^{n} w_j} \quad (13)$$

$$w_j = f(X_i, X_j)g(F_i, F_j)$$

In Formula (13), i represents the position of a target pixel, and j represents the position within a predetermined range around i. In other words, the intensity ratio Fi' of the still region 333 at the position i is determined by the weighted average of the peripheral intensity ratio Fj. In this case, the weight Wj is determined by the product of f(xi, xj) and g(Fi, Fj) as shown in Formula (13).

The function f(xi, xj) is the function determined by the distance between the position i and the position j, and if the distance is small, large value is outputted, but if the distance is large, small value is outputted. The function g(Fi, Fj) is the function determined by a value of the intensity ratio, and if the difference between values of the intensity ratio is small, large value is outputted, but if the difference is large, small value is outputted From Formula (13), the flicker conversion coefficient equal to the intensity ratio of the still region at each point can be calculated, and the motion contribution for each intensity ratio can be represented by the degree of divergence between each intensity ratio and the flicker conversion coefficient equal to the calculated intensity ratio of the still region.

From the above, it is possible to detect motion with robustness even when spatial variation of flicker illumination exists.

The image processing unit 103 according to the third embodiment can be configured to be similar to the image processing unit 103 (FIG. 14) according to the first embodiment, and thus will not be described in detail herein.

Figure 25:
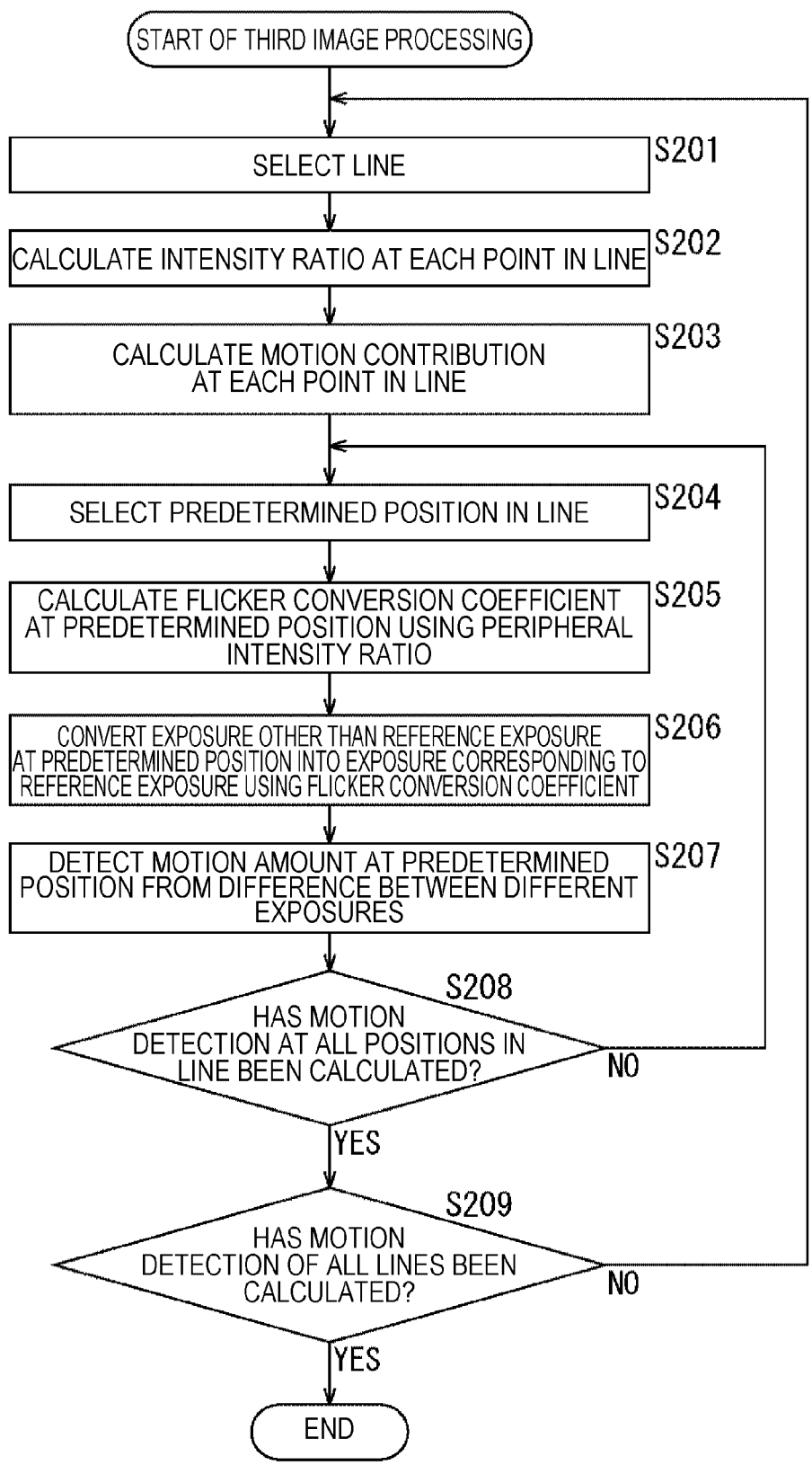
FIG. 25 is a flowchart illustrated to describe an operation performed by an image processing unit according to the third embodiment.

FIG. 25 is a flowchart illustrated to describe the processing when the image processing unit 103 shown in FIG. 14 performs a process according to the third embodiment.

In step S201, the line selection unit 301 selects a line to be processed. In step S202, the intensity ratio calculation unit 303 calculates an intensity ratio. In step S203, the motion contribution calculation unit 304 calculates a motion contribution. These processes are performed similarly to those of steps S101 to S103 of FIG. 17.

In step S104, the flicker conversion coefficient calculation unit 305 selects a predetermined position in a line as the position used to calculate a flicker conversion coefficient. In step S205, the flicker conversion coefficient calculation unit 305 calculates a flicker conversion coefficient at the predetermined position using a peripheral intensity ratio on the basis of Formula (13).

In this way, when the flicker conversion coefficient calculation unit 305 calculates a flicker coefficient, the process proceeds to step S206 and the motion detection unit 306 performs a process for detecting motion. The processes of steps S206 to S209 are performed similarly to those of steps S106 to S109 of the flowchart shown in FIG. 17.

Thus, according to the third embodiment, it is possible to perform the motion detection that is unaffected by the flicker even when the influence of the flicker light source is different spatially, thereby improving the accuracy of the motion detection.

The first to third embodiments described above can be configured to be carried out independently or can be combined with each other. As one example, it is possible to have a configuration in which determination of whether the flicker is spatially non-uniform is performed, and if it is uniform, the process described with reference to the first embodiment may be performed; meanwhile if it is non-uniform, the process described with reference to the third embodiment may be performed.

<Advantageous Effect>

According to the present technology, it is possible to detect motion that is unaffected by the flicker even under the flicker environment. The detection of motion can be performed to cope with even spatial variation of the flicker.

It is possible to detect motion from one captured image, and thus latency does not occur. It is unnecessary to provide a frame memory, and thus it is possible to achieve a low-cost hardware. As one example, in the related art, there is a technique in which image data for three frames is accumulated and the influence of flicker is estimated using the image data for three frames, thereby eliminating the influence of flicker.

In this case, it is necessary to provide a frame memory to accumulate image data for three frames, and thus the cost for hardware fails to be reduced. In addition, the process is initiated only after image data for three frames is accumulated, and thus a delay will occur.

Meanwhile, according to the present technology, it is possible to achieve a low-cost hardware and prevent the occurrence of delay.

Furthermore, at the time of detecting motion, there is no restriction for the exposure time to be aligned with the period of flicker, thereby setting desired exposure time.

As one example, the flicker has periodicity, and thus it is conceivable to capture an image with no flicker component by controlling the exposure time to be an integral multiple of the period of the flicker. In this case, the exposure time will be limited to the integral multiple of the period of flicker. However, according to the present technology, it is possible to set desired exposure time and to perform motion detection with the reduced influence of the flicker.

As described above, as one example, it is possible to acquire a flicker free image with different exposure times by capturing the image so that the capturing of long exposure is performed in a flicker free state. To perform image capturing in a flicker free state, as one example, it is conceivable to capture an image by controlling the exposure time to be an integral multiple of the period of flicker. In this case, a limitation is applied to the exposure time, but it is possible to acquire an HDR image from a flicker free image with different exposure times.

The configuration of the image processing unit for acquiring the HDR image and performing motion detection from the image with different exposure times can be simplified, and thus it is possible to achieve a low-cost hardware and reduction in abilities for the processing.

Figure 26:
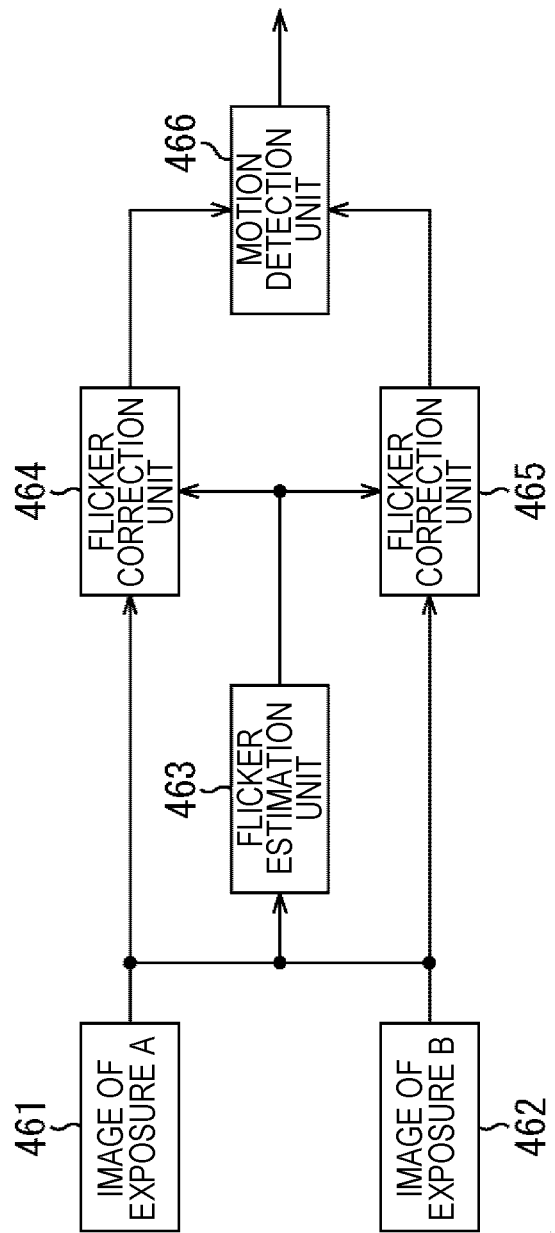
FIG. 26 is a diagram illustrating the configuration of a processing unit concerning the motion detection in related art.

FIG. 26 shows the configuration of a processing unit for performing motion detection in related art for the purpose of reference. The processing unit includes a flicker estimation unit 463, a flicker correction unit 464, a flicker correction unit 465, and a motion detection unit 466. The flicker estimation unit 463 receives and estimates a flicker component using an image 461 of the exposure A and an image 462 of the exposure B.

The result obtained by the estimation is supplied to the flicker correction unit 464 and the flicker correction unit 465. The flicker correction unit 464 receives the image 461 of the exposure A as an input. The flicker correction unit 464 eliminates the flicker that exists in the image 461 of the exposure A using the result obtained by the estimation of the flicker estimation unit 463 and generates a flicker free image.

Similarly, the flicker correction unit 465 eliminates the flicker that exists in the image 462 of the exposure B using the result obtained by the estimation of the flicker estimation unit 463 and generates a flicker free image. The motion detection unit 466 performs motion detection using two flicker free images.

In such a process, it is necessary to provide the flicker estimation unit 463, the flicker correction unit 464, the flicker correction unit 465, and the motion detection unit 466.

However, according to the present technology, the estimation and correction of the flicker are not performed, and thus it is not necessary to provide the flicker estimation unit 463, the flicker correction unit 464, or the flicker correction unit 465. Thus, according to the present technology, it is possible to simplify the configuration of the processing unit relating to the motion detection. Furthermore, according to the present technology, when the HDR composition is performed using a plurality of pieces of exposure information, it is possible to have a configuration in which the HDR image and motion information can be acquired simultaneously from one captured image.

<Other Configurations>

As described above, according to the present technology, it is possible to output the motion information 121. A description will be given with reference again to the image processing unit 103 shown in FIG. 14. The motion contribution calculation unit 304 calculates an index indicating the degree of how much motion contributes to the intensity ratio at each point calculated by the intensity ratio calculation unit 303. The motion contribution is an index used to judge whether the intensity ratio of each point is derived from motion or is derived from flicker.

Thus, it is possible to judge whether the intensity ratio is derived from motion by the motion contribution outputted from the motion contribution calculation unit 304. Thus, this motion contribution may be used as the motion information 121. In such a case, the image processing unit 103 may be configured as shown in FIG. 27.

Figure 27:
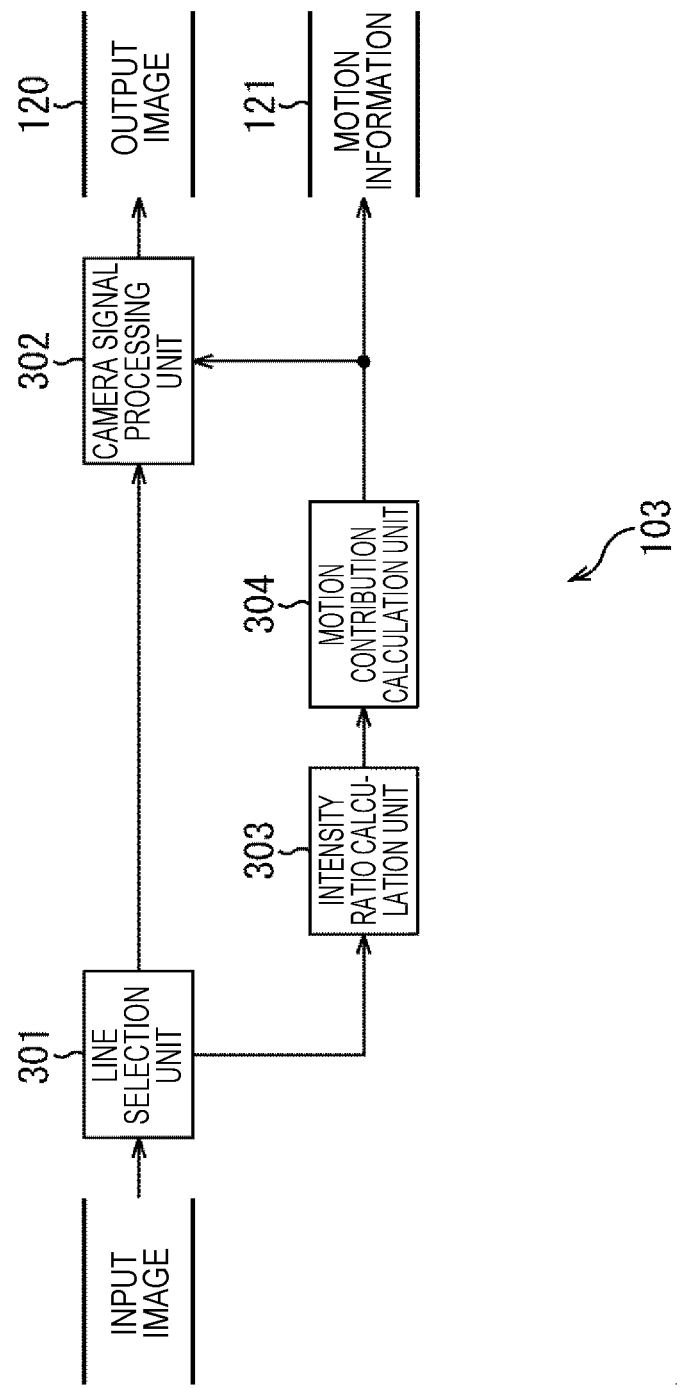
FIG. 27 is a diagram illustrating another configuration of the image processing unit.

The image processing unit 103 shown in FIG. 27 is configured to include a line selection unit 301, a camera signal processing unit 302, an intensity ratio calculation unit 303, and a motion contribution calculation unit 304. The image processing unit 103 shown in FIG. 27 is different from the image processing unit 103 shown in FIG. 14 in that the image processing unit 103 shown in FIG. 27 is configured with no use of the flicker conversion coefficient calculation unit 305 and the motion detection unit 306 from the image processing unit 103 shown in FIG. 14.

In the case of such a configuration, the motion contribution outputted from the motion contribution calculation unit 304 is supplied, as the motion information 121, to a processing unit of a subsequent stage. In the case of such a configuration, the accuracy of the motion information 121 is likely to fall down a little, but it is possible to have a configuration for outputting the motion information 121 and the output image 120.

Although the motion contribution from the motion contribution calculation unit 304 may be outputted as the motion information 121, it is also possible to have a configuration being provided with the motion detection unit 306 by which a portion having large motion contribution is detected as motion and the motion information 121 is generated and outputted.

<Other Configurations of Imaging Device>

Figure 28:
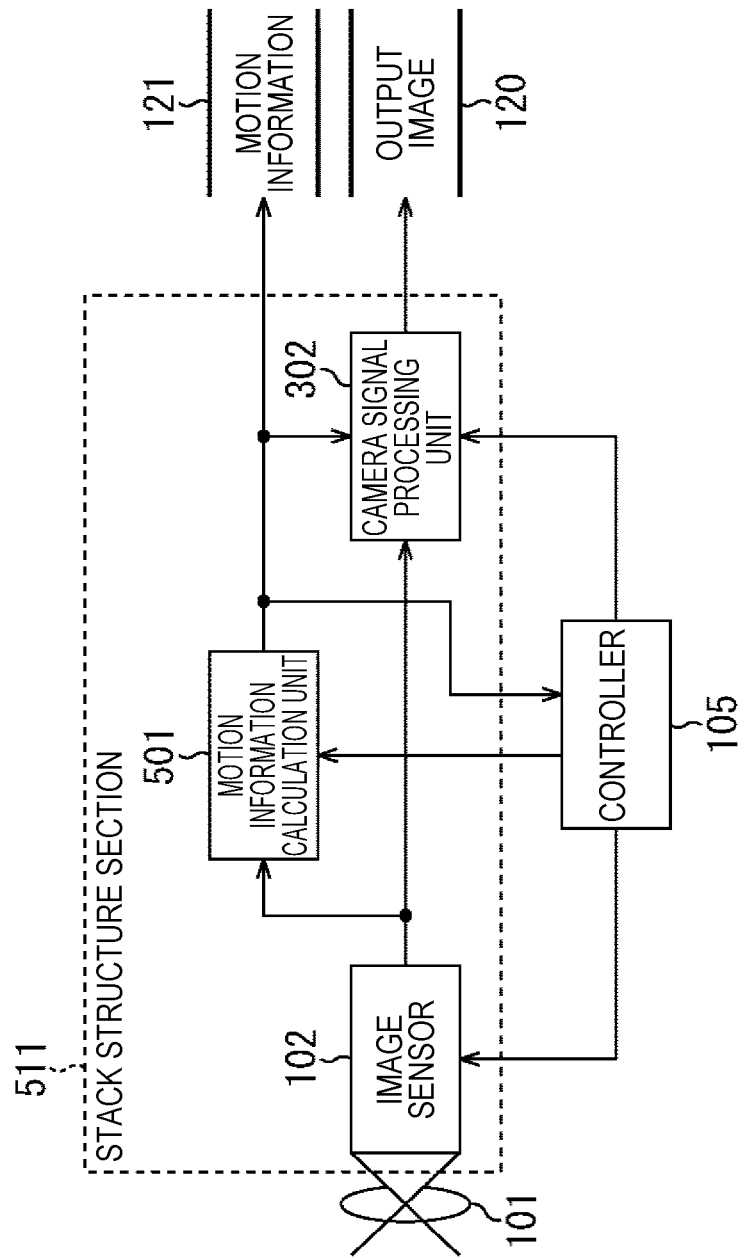
FIG. 28 is a diagram illustrating another configuration of the imaging device.
Figure 29:
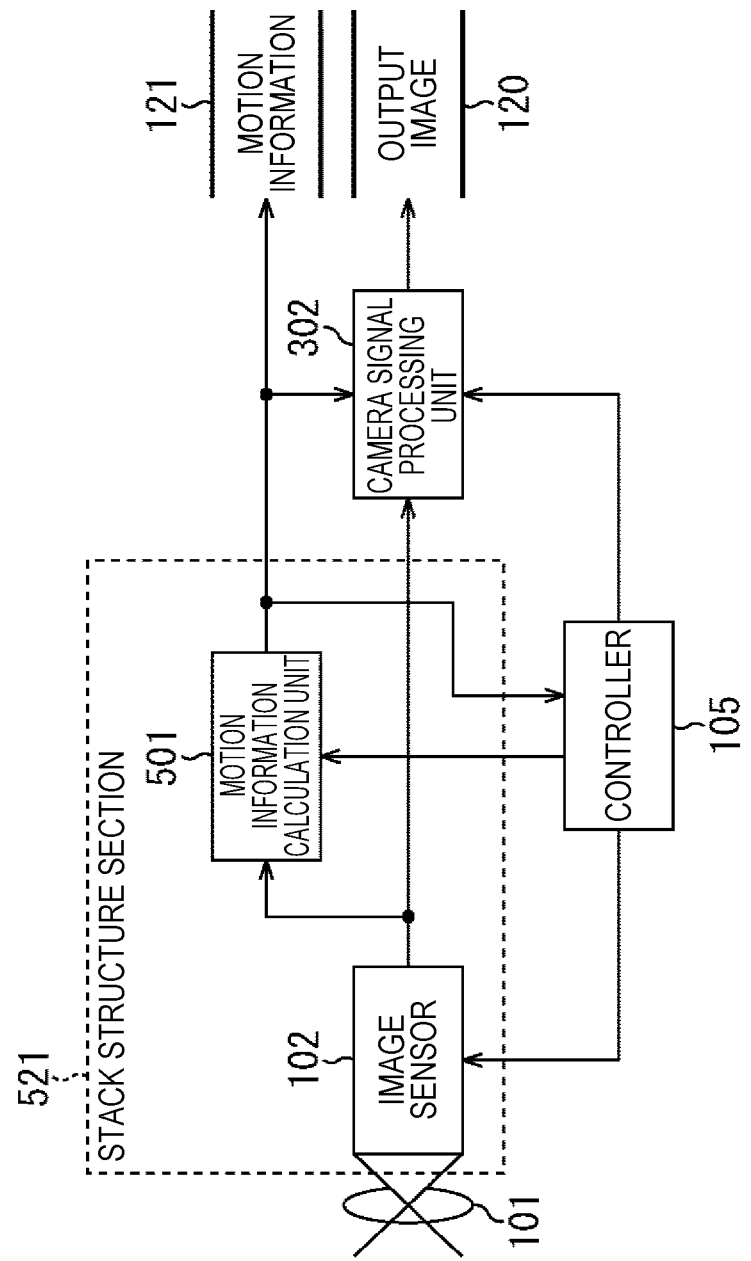
FIG. 29 is a diagram illustrating another configuration of the imaging device.
Figure 30:
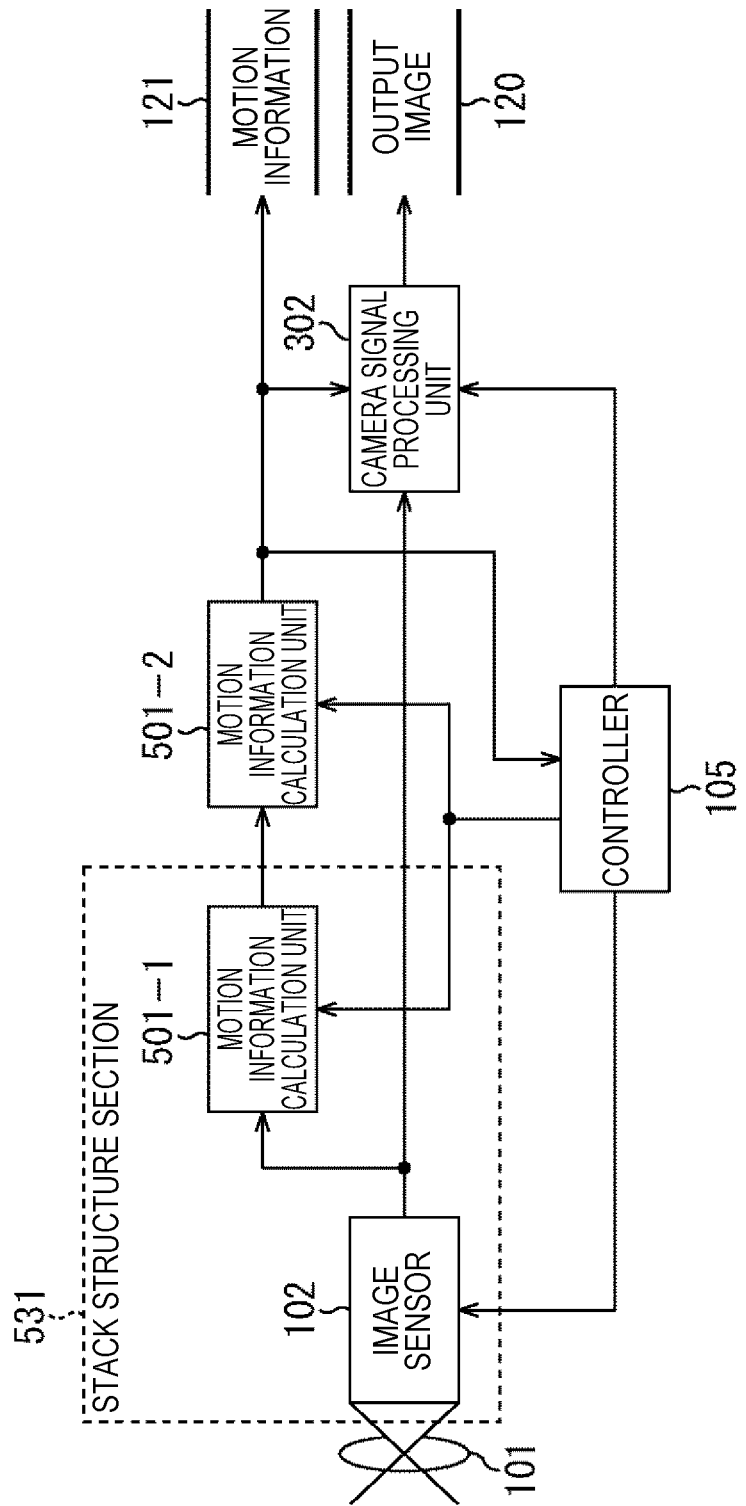
FIG. 30 is a diagram illustrating another configuration of the imaging device.

FIGS. 28 to 30 are diagrams illustrating another configuration of the imaging device 100. In FIGS. 28 to 30, components that are the same as those of FIG. 3 are denoted with the same reference numerals, and thus will not be described in detail.

In FIGS. 28 and 29, a motion information calculation unit 501 is used to calculate the motion information 121. The motion information calculation unit 501 is configured to include the line selection unit 301, the intensity ratio calculation unit 303, the motion contribution calculation unit 304, the flicker conversion coefficient calculation unit 305, and the motion detection unit 306 of the image processing unit 103 shown in FIG. 14.

In FIGS. 28 and 29, the motion information calculation unit 501 is configured to include the line selection unit 301, the intensity ratio calculation unit 303, the motion contribution calculation unit 304, the flicker conversion coefficient calculation unit 305, the motion detection unit 306, the flicker conversion coefficient updating unit 401, and the flicker period detection unit 402 of the image processing unit 103 shown in FIG. 21.

In the imaging device 100 shown in FIG. 28, the image sensor 102, the camera signal processing unit 302, and the motion information calculation unit 501 are configured as a stack structure section 511. The configuration shown in FIG. 28 is implemented as a structure having the stack structure section 511 in which the image sensor 102, the camera signal processing unit 302, and the motion information calculation unit 501 are integrated.

In the imaging device 100 shown in FIG. 29, the image sensor 102 and the motion information calculation unit 501 are configured as a stack structure section 521. The configuration shown in FIG. 29 is implemented as a structure having the stack structure section 521 in which the image sensor 102 and the motion information calculation unit 501 are integrated.

In the imaging device 100 shown in FIG. 30, the motion information calculation unit 501 is divided into a motion information calculation unit 501-1 and a motion information calculation unit 501-2, and the image sensor 102 and the motion information calculation unit 501-1 are integrated to form a stack structure section 531. The configuration shown in FIG. 30 is implemented as a structure having the stack structure section 531 in which the image sensor 102 and the motion information calculation unit 501-1 are integrated.

As the imaging device 100 shown in FIG. 30, the motion information calculation unit 501 may be divided into the motion information calculation unit 501-1 and the motion information calculation unit 501-2. In this case, if the one is configured as a stack structure integrated with the image sensor 102 and the other is configured not to be included in a stack structure, the line selection unit 301, the intensity ratio calculation unit 303, the motion contribution calculation unit 304, the flicker conversion coefficient calculation unit 305, and the motion detection unit 306 of the image processing unit 103 shown in FIG. 14 are included in either the motion information calculation unit 501-1 or the motion information calculation unit 501-2.

When the motion information calculation unit 501 is configured to include the line selection unit 301, the intensity ratio calculation unit 303, the motion contribution calculation unit 304, the flicker conversion coefficient calculation unit 305, the motion detection unit 306, the flicker conversion coefficient updating unit 401, and the flicker period detection unit 402 of the image processing unit 103 shown in FIG. 21, they are included in either the motion information calculation unit 501-1 or the motion information calculation unit 501-2.

Although the motion information calculation unit 501 outputs the motion information 121 for each frame, the motion information can be used by the camera signal processing unit 302 or can used by the controller 105. As one example, it is possible to control the exposure length of the image sensor 102 so that a moving subject is not blurred by feeding back the motion information 121 to the controller 105, and to perform more effective image processing, for example, to process adaptively deblurring or noise reduction (NR) on the motion region by allowing the camera signal processing unit 302 to use the motion information 121.

Thus, the motion information calculation unit 501 can be configured as a stack structure integrated with other portions wholly or in part.

<Recording Medium>

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 31 is a block diagram showing an example configuration of the hardware of a computer that executes the series of processes described earlier according to a program. In a computer, a central processing unit (CPU) 1101, a read only memory (ROM) 1102, and a random access memory (RAM) 1103 are mutually connected via a bus 1104. An input/output interface 1105 is also connected to the bus 1104. An input unit 1106, an output unit 1107, a storage unit 1108, a communication unit 1109, and a drive 1110 are connected to the input/output interface 1105.

The input unit 1106 is configured from a keyboard, a mouse, a microphone or the like. The output unit 1107 configured from a display, a speaker or the like. The storage unit 1108 is configured from a hard disk, a non-volatile memory or the like. The communication unit 1109 is configured from a network interface or the like. The drive 1110 drives a removable medium 1111 such as a magnetic disk, an optical disk, a magneto-optical disk, a semiconductor memory or the like.

In the computer configured as described above, as one example the CPU 1101 loads a program stored in the storage unit 1108 via the input/output interface 1105 and the bus 1104 into the RAM 1103 and executes the program to carry out the series of processes described earlier.

As one example, the program executed by the computer (the CPU 1101) may be provided by being recorded on the removable medium 1111 as a packaged medium or the like. The program can also be provided via a wired or wireless transfer medium, such as a local area network, the Internet, or a digital satellite broadcast.

In the computer, by loading the removable medium 1111 into the drive 1110, the program can be installed into the storage unit 1108 via the input/output interface 1105. It is also possible to receive the program from a wired or wireless transfer medium using the communication unit 1109 and install the program into the storage unit 1108. As another alternative, the program can be installed in advance into the ROM 1102 or the storage unit 1108.

Note that the program executed by the computer may be a program in which processes are carried out in a time series in the order described in the present specification or may be a program in which processes are carried out in parallel or at necessary timing, such as when the processes are called.

Further, in the present specification, a system means the whole apparatus configured by a plurality of devices.

In addition, the effects described in the present specification are not limiting but are merely examples, and there may be additional effects.

An embodiment of the present technology is not limited to the embodiments described above, and various changes and modifications may be made without departing from the scope of the present technology.

Additionally, the present technology may also be configured as below.

(1)

An image processing device including:

an intensity ratio calculation unit configured to calculate a ratio relating to an intensity of a signal value at a predetermined position in an image captured under different exposure conditions; and a contribution calculation unit configured to calculate a contribution indicating whether an intensity ratio calculated by the intensity ratio calculation unit is derived from a periodic noise component or is derived from motion.

(2)

The image processing device according to (1), wherein the periodic noise is flicker.

(3)

The image processing device according to (1) or (2), wherein the intensity ratio calculation unit calculates the intensity ratio from one image captured using an image sensor in which pixels for which the different exposure conditions are set exist together.

(4)

The image processing device according to (1) or (2), wherein the intensity ratio calculation unit calculates the intensity ratio from a plurality of images that are captured under the different exposure conditions.

(5)

The image processing device according to any of (1) to (4),
wherein a position in the image having the contribution calculated by the contribution calculation unit greater than or equal to a predetermined value is detected as motion.

(6)

The image processing device according to any of (1) to (5),
wherein the intensity ratio is a ratio of pixel values of a pixel to be a calculation target in the image captured under the different exposure conditions or is a ratio of signal values calculated from a pixel value of a pixel in an adjacent region of a pixel to be a calculation target.

(7)

The image processing device according to any of (1) to (6), further including:
a conversion coefficient calculation unit configured to calculate a conversion coefficient using the intensity ratio calculated by the intensity ratio calculation unit, the conversion coefficient being used to, when the periodic noise of a first image captured under a first exposure condition is set as a reference, convert the periodic noise of a second image captured under a second exposure condition into the periodic noise set as the reference.

(8)

The image processing device according to (7),
wherein the conversion coefficient calculation unit sets an intensity ratio of a mode value of the intensity ratios calculated by the intensity ratio calculation unit to the conversion coefficient.

(9)

The image processing device according to (7),
wherein the conversion coefficient calculation unit sets a median value of the intensity ratios calculated by the intensity ratio calculation unit to the conversion coefficient.

(10)

The image processing device according to (7),
wherein the conversion coefficient calculation unit sets a weighted mean value of the intensity ratio calculated by the intensity ratio calculation unit to the conversion coefficient.

(11)

The image processing device according to (7),
wherein motion in the image is detected by converting the periodic noise of the second image into the periodic noise set as the reference using the conversion coefficient calculated by the conversion coefficient calculation unit and by taking a difference between the converted second image and the first image.

(12)

The image processing device according to (7), further including:
a period detection unit configured to determine a period of the periodic noise from a change in the conversion coefficients calculated by the conversion coefficient calculation unit.

(13)

The image processing device according to (12), further including:
an updating unit configured to update the conversion coefficient calculated by the conversion coefficient calculation unit using a period detected by the period detection unit.

(14)

The image processing device according to (7),
wherein the conversion coefficient is calculated for each line in a horizontal direction within the image.

(15)

The image processing device according to (7),
wherein the conversion coefficient is calculated for each pixel in a line in a horizontal direction within the image and is calculated using the intensity ratio within a predetermined range around a pixel to be a calculation target.

(16)

The image processing device according to (1), further including:
a conversion coefficient calculation unit configured to calculate a conversion coefficient used to, when the periodic noise of a first image captured under a first exposure condition that is set to an integral multiple of a period of the periodic noise is set as a reference, convert the periodic noise of a second image captured under a second exposure condition into the periodic noise set as the reference.

(17)

The image processing device according to any of (1) to (16),
wherein the image processing device has a stack structure together with an image sensor configured to capture an image under the different exposure conditions.

(18)

An image processing method including the steps of:
calculating a ratio relating to an intensity of a signal value at a predetermined position in an image captured under different exposure conditions; and
calculating a contribution indicating whether the calculated intensity ratio is derived from a periodic noise component or is derived from motion.

(19)

A computer-readable program for causing an image processing device configured to process an image captured using an image sensor to execute a process including steps of:
calculating a ratio relating to an intensity of a signal value at a predetermined position in an image captured under different exposure conditions; and
calculating a contribution indicating whether the calculated intensity ratio is derived from a periodic noise component or is derived from motion.

(20)

An electronic apparatus including:
an image processing unit configured to include
an intensity ratio calculation unit configured to calculate
  a ratio relating to an intensity of a signal value at a predetermined position in an image captured under different exposure conditions, and
a contribution calculation unit configured to calculate a
  contribution indicating whether an intensity ratio calculated by the intensity ratio calculation unit is derived from a periodic noise component or is derived from motion; and a signal processing unit configured to perform signal processing on a signal outputted from the image processing unit.

REFERENCE SIGNS LIST 100 imaging device
101 optical lens
102 image sensor
103 image processing unit
104 signal processing unit
105 controller
301 line selection unit
303 intensity ratio calculation unit
304 motion contribution calculation unit
305 flicker conversion coefficient calculation unit
306 motion detection unit
401 flicker conversion coefficient updating unit
402 flicker period detection unit

The invention claimed is:

1. An image processing device, comprising:
a central processing unit (CPU) configured to:
calculate an intensity ratio relating to an intensity of a signal value at a determined position in an image captured under different exposure conditions;
calculate a contribution indicating whether the calculated intensity ratio is derived from a periodic noise component or is derived from motion;
calculate a conversion coefficient based on the calculated intensity ratio;
set a periodic noise of a first image captured under a first exposure condition as a reference; and
convert, based on the calculated conversion coefficient, a periodic noise of a second image captured under a second exposure condition into the periodic noise of the first image set as the reference.

2. The image processing device according to claim 1, wherein the periodic noise component is flicker.

3. The image processing device according to claim 1,
wherein the CPU is further configured to calculate the intensity ratio based on one image captured by an image sensor, and
wherein the image sensor includes a plurality of pixels for which the different exposure conditions are set.

4. The image processing device according to claim 1, wherein the CPU is further configured to calculate the intensity ratio based on a plurality of images that are captured under the different exposure conditions.

5. The image processing device according to claim 1, wherein the CPU is further configured to detect motion based on a position in the image having the calculated contribution greater than or equal to a determined value.

6. The image processing device according to claim 1, wherein the intensity ratio is one of a ratio of pixel values of a first pixel to be a first calculation target in the image captured under the different exposure conditions or a ratio of signal values calculated from a pixel value of a second pixel in an adjacent region of a third pixel to be a second calculation target.

7. The image processing device according to claim 1, wherein the CPU is further configured to set a first intensity ratio of a mode value of a plurality of intensity ratios as the conversion coefficient.

8. The image processing device according to claim 1, wherein the CPU is further configured to set a median value of a plurality of intensity ratios as the conversion coefficient.

9. The image processing device according to claim 1, wherein the CPU is further configured to set a weighted mean value of a plurality of intensity ratios as the conversion coefficient.

10. The image processing device according to claim 1, wherein the CPU is further configured to detect the motion in the image based on conversion of the periodic noise of the second image into the periodic noise of the first image set as the reference and a difference between the converted second image and the first image.

11. The image processing device according to claim 1, wherein the CPU is further configured to calculate the conversion coefficient for each line in a horizontal direction within the image.

12. The image processing device according to claim 1,
wherein the CPU is further configured to calculate the conversion coefficient for each pixel in a line in a horizontal direction within the image, and
wherein the conversion coefficient is calculated based on the intensity ratio within a determined range around a pixel to be a calculation target.

13. An image processing method, comprising:
calculating an intensity ratio relating to an intensity of a signal value at a determined position in an image captured under different exposure conditions;
calculating a contribution indicating whether the calculated intensity ratio is derived from a periodic noise component or is derived from motion;
calculating a conversion coefficient based on the calculated intensity ratio;
setting a periodic noise of a first image captured under a first exposure condition as a reference; and
converting, based on the calculated conversion coefficient, a periodic noise of a second image captured under a second exposure condition into the periodic noise of the first image set as the reference.

14. A non-transitory computer-readable medium having stored thereon, computer-executable instructions which, when executed by a computer, cause the computer to execute operations, the operations comprising:
calculating an intensity ratio relating to an intensity of a signal value at a determined position in an image captured under different exposure conditions;
calculating a contribution indicating whether the calculated intensity ratio is derived from a periodic noise component or is derived from motion;
calculating a conversion coefficient based on the calculated intensity ratio;
setting a periodic noise of a first image captured under a first exposure condition as a reference; and
converting, based on the calculated conversion coefficient, a periodic noise of a second image captured under a second exposure condition into the periodic noise of the first image set as the reference.

* * * * *